US012526230B2

(12) United States Patent
Vippagunta et al.

(10) Patent No.: US 12,526,230 B2
(45) Date of Patent: Jan. 13, 2026

(54) LOAD AWARE ROUTING FOR HETEROGENEOUS MACHINE LEARNING MODELS ACCESS VIA A COMMON NETWORK ENDPOINT

(71) Applicant: Amazon Technologies, Inc., Seattle, WA (US)

(72) Inventors: Rajendra Kumar Vippagunta, Issaquah, WA (US); Aaron Keller, Bellevue, CA (US); Tianxing Zhou, Seattle, WA (US); Zhi Cong Tan, Burnaby (CA); Saurabh Mukund Trikande, Bothell, WA (US); David Nigenda, Lake Stevens, WA (US); Xu Deng, Shoreline, WA (US); Lakshmi Naarayanan Ramakrishnan, Redmond, WA (US); Deepti Laxman Ragha, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/518,902

(22) Filed: Nov. 24, 2023

(65) Prior Publication Data

US 2025/0175423 A1 May 29, 2025

(51) Int. Cl.
*H04L 45/00* (2022.01)
*G06F 9/50* (2006.01)
*H04L 67/1008* (2022.01)

(52) U.S. Cl.
CPC ............ *H04L 45/70* (2013.01); *G06F 9/5083* (2013.01); *H04L 45/38* (2013.01); *H04L 67/1008* (2013.01)

(58) Field of Classification Search
CPC ....... G06F 9/5083; H04L 45/38; H04L 45/70; H04L 67/1008
See application file for complete search history.

(56) References Cited

U.S. PATENT DOCUMENTS

| | | | |
|---|---|---|---|
| 7,774,473 B2 * | 8/2010 | Elving | H04L 67/1008 709/227 |
| 10,354,201 B1 | 7/2019 | Roy et al. | |
| 10,805,179 B2 * | 10/2020 | Guim Bernat | H04L 67/12 |
| 11,170,309 B1 | 11/2021 | Stefani et al. | |
| 11,221,885 B1 | 1/2022 | Ross et al. | |
| 11,356,339 B2 * | 6/2022 | Guim Bernat | H04L 67/12 |
| 11,368,550 B2 * | 6/2022 | Trapane | H04L 67/12 |
| 11,550,614 B2 | 1/2023 | Faulhaber, Jr. et al. | |
| 11,663,523 B2 | 5/2023 | Polleri et al. | |

(Continued)

OTHER PUBLICATIONS

Edward Hu, et al., "Lora: Low-Rank Adaptation of Large Language Models", arXiv:2106.09685v2, Oct. 16, 2016, pp. 1-26.

(Continued)

*Primary Examiner* — G. C. Neurauter, Jr.
(74) *Attorney, Agent, or Firm* — S. Scott Foster; Kowert, Hood, Munyon, Rankin & Goetzel, P.C.

(57) ABSTRACT

Load aware routing is performed for requests to managed network endpoints for heterogeneous machine learning models. A request to generate an inference is received via a managed network endpoint that invokes a specified machine learning model. Workloads of the different hosts for respective replicas of the machine learning model are evaluated to select one of the hosts to perform the request.

20 Claims, 19 Drawing Sheets

(56) References Cited

U.S. PATENT DOCUMENTS

| | | | | |
|---|---|---|---|---|
| 11,743,143 | B2* | 8/2023 | Guim Bernat | H04L 67/63 |
| 12,159,167 | B2* | 12/2024 | Yang | G06F 9/5027 |
| 2019/0156247 | A1* | 5/2019 | Faulhaber, Jr. | G06N 3/045 |
| 2020/0104750 | A1* | 4/2020 | Kandoi | G06N 20/20 |
| 2024/0177025 | A1* | 5/2024 | Ezrielev | G06N 5/043 |
| 2024/0195733 | A1* | 6/2024 | Sanvito | H04L 41/16 |

OTHER PUBLICATIONS

U.S. Appl. No. 18/518,927, filed Nov. 24, 2023, Saurabhn Mukund Trikande, et al.
U.S. Appl. No. 18/518,925, filed Nov. 24, 2023, Andrea Olgiati, et al.
International Search Report and Written Opinion mailed Feb. 27, 2025 in PCT/US2024/055952, Amazon Technologies, Inc., pp. 1-11.
Anonymous, "Amazon SageMaker: Developer Guide," Apr. 22, 2021, Retrieved from Internet: URL https://dokumen.pub/amazon-sagemaker-developer-guide.htm (retrieved Feb. 16, 2023), 32 pages.
Anonymous, "Build, Train, and Deploy a Machine Learning Model with Amazon SageMaker," Mar. 21, 2023, Retrieved from the Internet: URL:https://web.archive.org/web/20230321180336/https://www.amazonzaews.cn/en/getting-started/tutorials/build-train-deploy-machine-learning-model-sagemaker/ (retrieved Feb. 13, 2025), 14 pages.

* cited by examiner

LOAD AWARE ROUTING FOR HETEROGENEOUS MACHINE LEARNING MODELS ACCESS VIA A COMMON NETWORK ENDPOINT

BACKGROUND

Machine-learned models and data-driven systems have been increasingly used to help make decisions in various application domains. These applications have provided benefits such as improved accuracy, increased productivity, and cost savings. This trend is the result of a confluence of factors, such as ubiquitous connectivity, the ability to collect, aggregate, and process large amounts of fine-grained data using cloud computing, and improved access to increasingly sophisticated machine learning models that can analyze this data.

Figure 1:
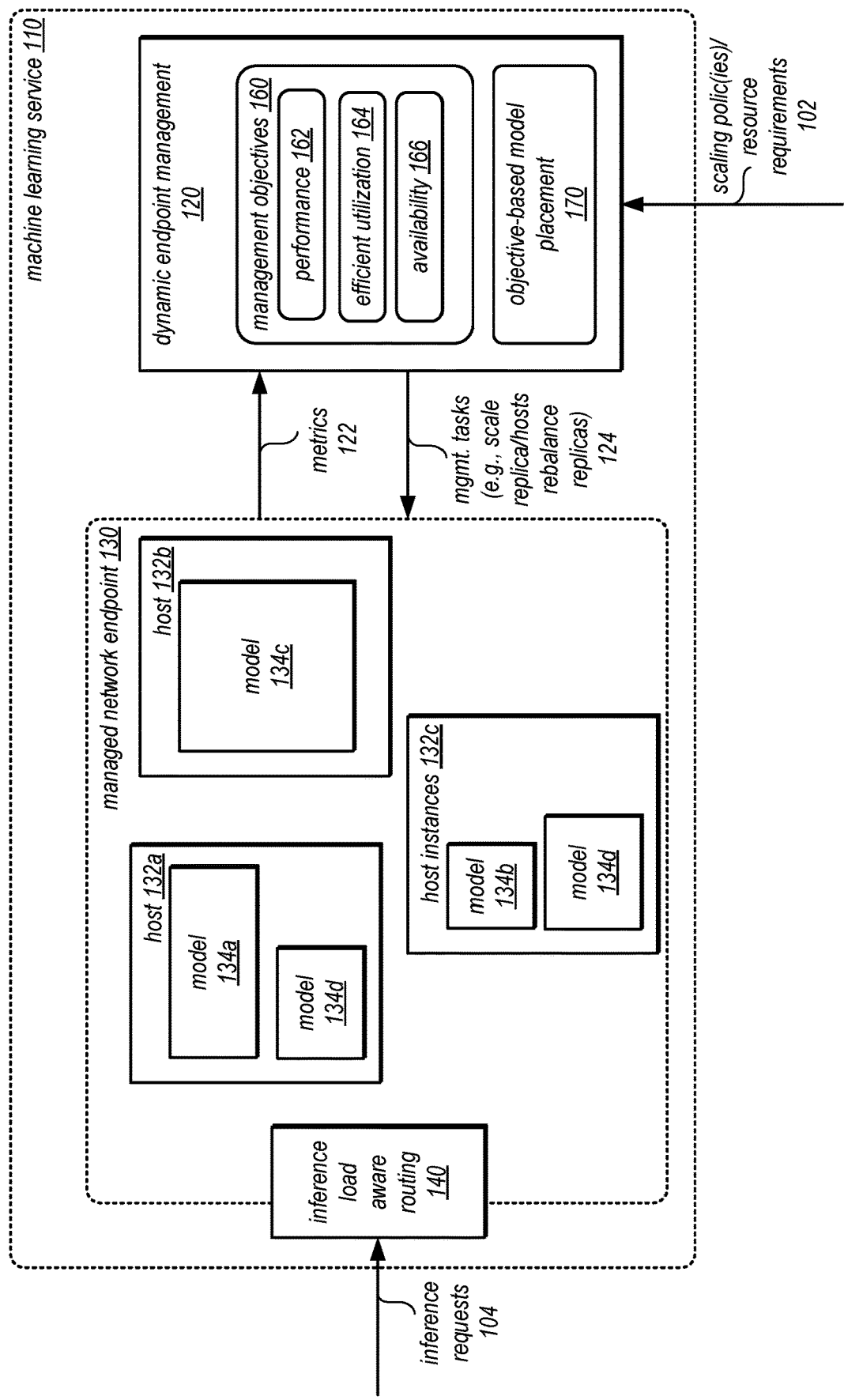
FIG. 1 is a logical block diagram that illustrates dynamic endpoint management for heterogeneous machine learning models, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Machine learning refers to a discipline by which computer systems can be trained to recognize patterns through repeated exposure to training data. In unsupervised learning, a self-organizing algorithm learns previously unknown patterns in a data set without any provided labels. In supervised learning, this training data includes an input that is labeled (either automatically, or by a human annotator) with a "ground truth" of the output that corresponds to the input. A portion of the training data set is typically held out of the training process for purposes of evaluating/validating performance of the trained model. The use of a trained model in production is often referred to as "inference," or a "prediction" during which the model receives new data that was not in its training data set and provides an output based on its learned parameters. The training and validation process may be repeated periodically or intermittently, by using new training data to refine previously learned parameters of a production model and deploy a new production model for inference, in order to mitigate degradation of model accuracy over time. Computer vision machine learning models, for example, may be trained using training data sets of image data and may also make inferences to perform various computer vision tasks, such as image classification, object detection, or image regression, among others.

As more systems, services, and applications integrate various features and operations based on inferences made by machine learning models, the use of multiple machine learning models being integrated for different tasks for one client, system, or service has increase. For example, generative machine learning models (sometimes referred to as generative artificial intelligence (AI)) are being integrated into machine learning (ML) applications to support performance of various tasks, such as tailored help assistants, transcript summarization, and AI-powered graphic designs. However, these models require powerful accelerators, like GPUs or specialized hardware, to perform well. As such models deployed in production, the number and complexity of models that are integrated into a single application may be challenging to manage. Moreover, wasted power, performance degradation, and various other technical challenges may arise if the infrastructure for hosting the model is not managed to maximize the utilization of accelerated compute instances.

To maximize hardware utilization, improve resiliency, increase availability, and address other technical concerns, containerization technologies, that implement operating system virtualization and orchestration, can be implemented to share and manage hardware across multiple workloads. However, building and maintaining this infrastructure can be costly and technically difficult. While some past infrastructure as a service solutions have supported running multiple workloads on a specific set of resources (e.g., CPU and single GPU instances), such solutions only support scaling multiple models as a single unit. This type of coarse grained control cannot account for many different scenarios in which workload variations, infrastructure, health, or other situations which may need more fine-grained management of models and computing resources on which they are deployed. For example, an FM that generates varying numbers of tokens (e.g., to provide generative text or other output) may be integrated into an application that needs to provide consistent performance, whether the generated number of tokens is large or small. Depending on the number of tokens that the FM has to generate, inference latencies can vary a lot from one request to another. Therefore, techniques that can adequately distribute workloads to resources in a way that maximizes utilization and still achieves consistent performance are highly desirable.

Various techniques for dynamic endpoint management for heterogeneous machine learning models are described herein. Dynamic endpoint management may allow for client applications to access multiple different machine learning models using a single network endpoint. Varying host systems with different hardware or other performance capabilities, such as hosts optimized for generative AI with multi-GPU and other specialized hardware, such as systolic-array based hardware, can be specified when adding machine learning models to the network endpoint, so that desired performance is achieved. Dynamic endpoint management may be performed for the network endpoint, automatically manages the containers (or other virtualization units) for optimal utilization, performance, and availability, and containers can be configured to scale up/down based on traffic. Models with intermittent traffic patterns can be scaled to zero, and the lifecycle of each model can be individually configured through an interface (e.g., via specified scaling policies).

In various embodiments, optimal placement strategies, including optimized placement of fine-tuned machine learning models at host systems, may be implemented to improve inference performance by co-locating related machine learning models together to avoid various latency penalties. Moreover, as discussed below, load aware routing techniques for heterogeneous machine learning models accessed via a common network endpoint may be implemented that intelligently routes the inference requests by keeping track of the requests that are currently being served and the availability of instances to serve new requests to achieve higher throughput. Moreover, these routing techniques may support continuously streaming responses back from the models so that applications can utilized the models associated with the managed network endpoint to build interactive applications such as chatbots and virtual assistance at scale. Thus, one of ordinary skill in the art may appreciate the various improvements to computer and machine learning-related technologies that are achieved through the various embodiments described in detail below.

FIG. 1 is a logical block diagram that illustrates dynamic endpoint management for heterogeneous machine learning models, according to some embodiments. Machine learning service 110 may be a standalone service that provides machine learning model hosting and management services, or a service that is implemented as part of a provider network (e.g., similar to machine learning service 210 in FIG. 2, which may offer many different features in addition to hosting, such as model training and development features along with integrations with other provider network services). Machine learning service 110 may implement managed network endpoint 130. Managed network endpoint 130 may support a number of different machine learning models (e.g., thousands), such as models 134*a*, 134*b*, 134*c*, and 134*d*. that are placed across different hosts, such as hosts 132*a*, 132*b*, and 132*c*. Models may be replicated, such that a model replica may be a copy of a machine learning model deployed at a specific host. For example, model 134*d* has model replicas on host 132*a* and 132*c*. These models may be added to the managed network endpoint 130 through one or multiple requests to machine learning service 110 (not illustrated), as discussed in the example requests below with regard to FIG. 3.

Machine learning service 110 may implement dynamic endpoint management 120, in various embodiments, in order to perform various management tasks 124 with respect to managed network endpoint 130. Some tasks may be implemented in order to handle workloads caused be serving inference requests 104 received via the managed network endpoint and routed to one replica of an invoked model. Other management tasks may relate to preparing or configuring the managed network endpoint (e.g., for future work, such as placing replicas for new models being associated with the managed network endpoint and deploying batch updates of patches or new model versions). When determining when and what management tasks to perform, dynamic endpoint management 120 may implement various management objectives 160. These management objectives may include performance objectives 162, efficient utilization objectives 164, and availability objectives 166. Each of these objectives may what and when management actions are performed. As part of performing many of these management tasks, objective-based model placement techniques 170, as discussed in detail below with regard to FIGS. 5-9 and 12-13. Some management tasks may be reactive, based on monitoring of metrics 122 collected for hosts 132 and models 134 in order to detect various events to perform, for example, replica rebalancing and replica or host scaling, as discussed in detail below with regard to FIG. 13. Because dynamic endpoint management 120 supports model-specific scaling policies and resource requirements 102 being received (e.g., via an interface as depicted below with regard to FIG. 3), when management tasks are performed, client application requirements (e.g., for specific model performance) as well as utilization or availability concerns (e.g., by scaling in accordance with a model specific policy) can be satisfied.

Figure 11:
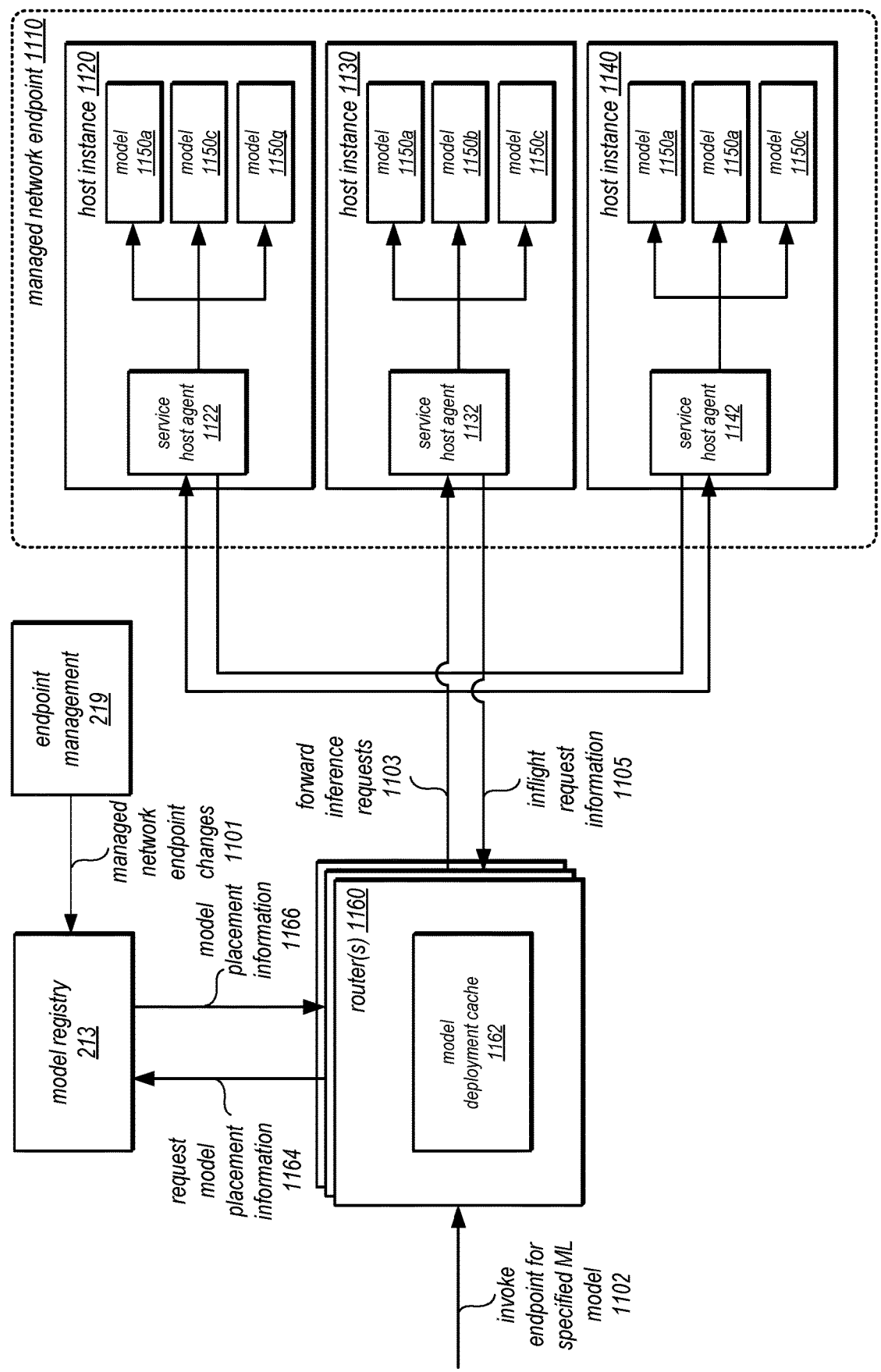
FIG. 11 is a logical block diagram of load aware routing techniques for a managed network endpoint, according to some embodiments.

As discussed in detail below with regard to FIGS. 11, 16, and 17, load aware routing techniques may be implemented as indicated at 140. For example, when inference requests are received, instead of randomly directing them to a host 132 with a replica of an invoked model, inference load aware routing 140 may use various workload information, such as the number of inflight requests to select between different hosts 132. In this way, inference requests can be optimally distributed.

Please note that the previous description of is a logical illustration of a machine learning service, including hosts, models, and dynamic endpoint management, and thus is not to be construed as limiting as to other embodiments of a machine learning system.

This specification continues with a general description of a provider network that implements multiple different services, including a machine learning service, which may implement local computing resource creation for performing machine learning tasks. Then various examples of, including different components, or arrangements of components that may implement dynamic endpoint management for heterogeneous machine learning models are discussed. A number of different methods and techniques to implement dynamic endpoint management for heterogeneous machine learning models are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
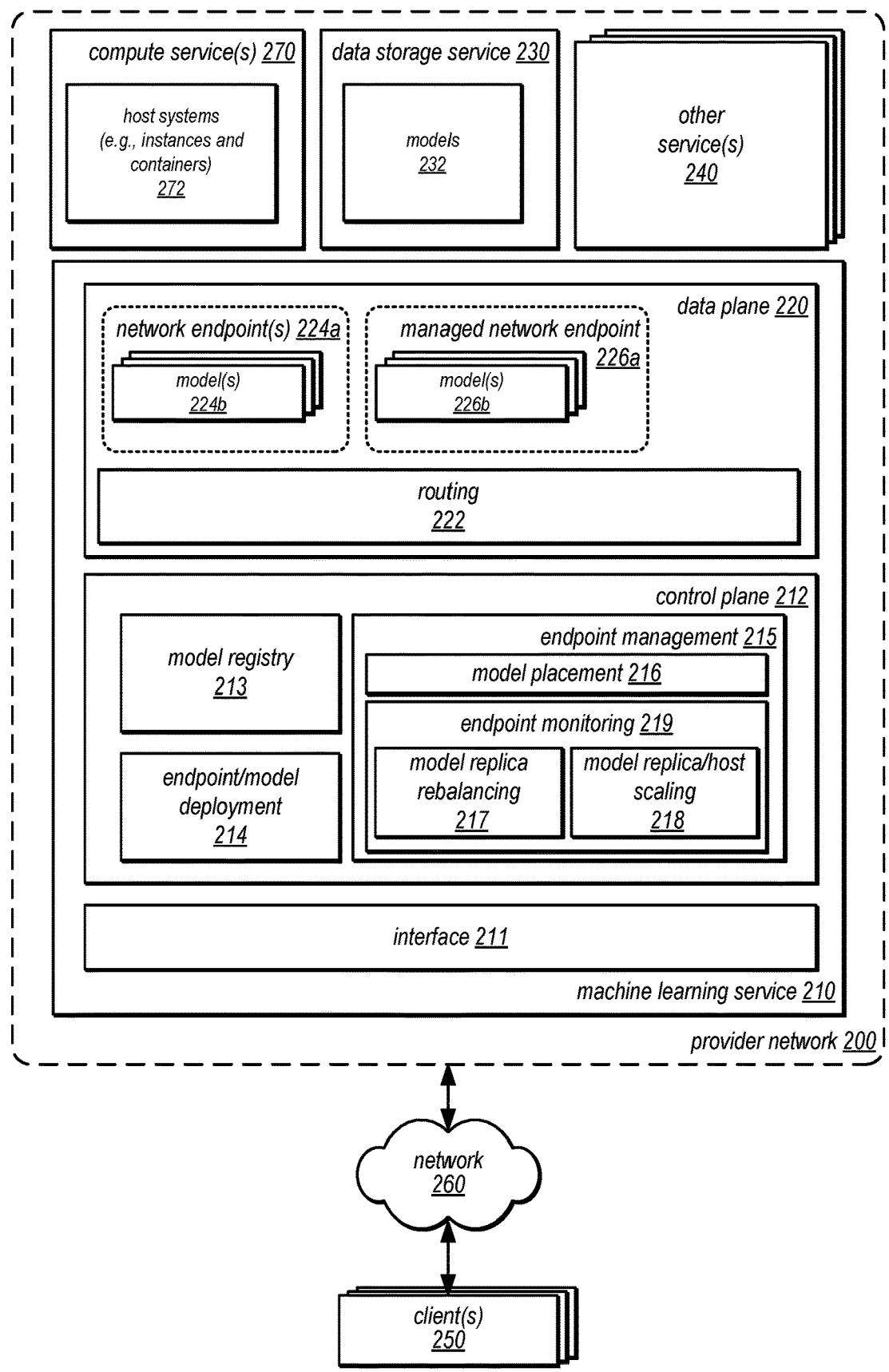
FIG. 2 is a logical block diagram that illustrates an example provider network that may implement a machine learning service that implements dynamic endpoint management for heterogeneous machine learning models, according to some embodiments.

FIG. 2 is a logical block diagram that illustrates an example provider network that may implement a machine learning service that implements dynamic endpoint management for heterogeneous machine learning models, according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment.

Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 200. The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network).

Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 200 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

Provider network 200 may be implemented in a single location or may include numerous data centers hosting various resource pools, such as collections of physical and/or virtualized computer servers, storage devices, networking equipment and the like (e.g., computing system 2000 described below with regard to FIG. 19), needed to implement and distribute the infrastructure and services offered by the provider network 200, in one embodiment. In some embodiments, provider network 200 may implement various computing resources or services, such as machine learning service 210, storage service(s) 230, compute service 270, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 19 and described below, in one embodiment. In various embodiments, the functionality of a given system or service component (e.g., a component of machine learning service 210 may be implemented by a particular node or may be distributed across several nodes. In some embodiments, a given node may implement the functionality of more than one service system component (e.g., more than one data store component).

Machine learning service 210 may implement interface 211 to allow clients (e.g., client(s) 250 or clients implemented internally within provider network 200, such as a client application hosted on another provider network service like an event driven code execution service or virtual compute service) to train and deploy machine learning models (e.g., neural networks or various other types of machine learning models). For example, interface 211 may implement a development interface for training machine learning models management interface for deploy machine learning models via both network endpoints 224a and managed network endpoints 226a. For example, machine learning service 210 may implement interface 211 (e.g., a graphical user interface, programmatic interface that implements Application Program Interfaces (APIs) and/or a command line interface) may be implemented so that a client can submit, edit, or otherwise implement various different model development, deployment, host system recommendation or other management requests. For example, interface 211 may include development and deployment environment interface, which may provide a training script or other code editor with various development tools to create, submit, and/or monitor machine learning pipeline with a training job and/or monitoring job. This development and management environment may be a graphical interface, in some embodiments, and may provide an interface to past results generated for other models, in some embodiments. Similarly, management interfaces may provide various graphical user interface features for creating and managing accounts, studio groups, authorizations, or various other features of machine learning service 210. As discussed below with regard to FIG. 3, interface 211 may support various deployment requests including requests to create and configure network endpoints associated with models, such as network endpoint(s) 224a and managed network endpoint(s) 226a.

Machine learning service 210 may implement a control plane 212 to perform various control operations to implement the features of machine learning service 210. For example, control plane may monitor the health and performance of requests at different components, such as training as part of model development and execution of machine learning models as part of model deployment. For example, if a node or other component fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s), in various embodiments. For example, control plane 212 may receive requests interface 211 which may be a programmatic interface, and identify an available node to begin work on the request.

In various embodiments, control plane 212 may include components that support the management of different types of endpoints, both network endpoint(s) 224a, which may be manually managed by a user of machine learning service 210, and managed network endpoints 226a, which may be similar to managed network endpoint 130 and is discussed in further detail below with regard to FIGS. 3-18. For example endpoint management 215 may be similar to dynamic endpoint management 120, implementing various techniques to perform management tasks based on management objectives 160. For example, as discussed in detail below with regard to FIG. 4, model placement 216 may be used to make placement decisions to add new models to one or more locations in satisfaction of resource requirements, availability requirements, and so on. Endpoint monitoring 219 may detect events that trigger performance of various management tasks, such as replica scaling, host scaling, 218, and replica rebalancing 217, as discussed in detail below with regard to FIGS. 5, 12 and 13. Control plane 212 may also implement model registry 213 and endpoint/model deployment 214 to handle requests to create network endpoints 224a, and 226a, as well as storing relevant information for the endpoints in model registry 213. FIG. 4, for example, illustrates the creation of a managed network endpoint. Endpoint/model deployment 214 may also be involved, along with endpoint management 215, in handling model updates in batches (or patching models) in rolling fashion, in some embodiments.

Although not illustrated, machine learning service 210 may implement development environment management to develop, configure, program, define, and/or otherwise execute training jobs on various machine learning models using data sets, such as data sets in storage services 230 across one or more host system types, and so on (which may include various configurations, sizes, and numbers of one or more respective processing devices for training, such as GPUs and other hardware (e.g., amount and speed of memory) and/or software capabilities). In some embodiments machine learning service 210 may offer various virtual machines, instances, containers, images, or other applications on these training nodes that may implement various machine learning training frameworks (e.g., TensorFlow, PyTorch, MXNet, and XGBoost, among others) upon which machine learning models may be specified or otherwise described using, for instance, a development environment, and executed. Various tests or other development operations for machine learning models may also be performed. In some embodiments, the various files, configuration information, and other data for machine learning model development may be organized as a project (or other collection) and stored, versioned, or otherwise managed by model development environment management (e.g., as a collection of one or more files or data objects in storage services 230).

Data plane 220 may include various features or artifacts that are used to perform training, development, or, as illustrated, deployed machine learning model(s) 224b and 226b, accessible via respective network endpoint(s) 224a and 226a. Network endpoints may be a network address, identifier, or other locator that is associated with a collection of resources, both host systems 272 and models 224. Network endpoints may be the target of requests to invoke hosted models 224 (e.g., API requests to generate an inference, in some embodiments). Routing layer 222 may implement various networking components, systems, or services, including load aware routing for managed network endpoints 226*a* as discussed above with regard to FIG. 1 and below with regard to FIG. 11. Routing 222 may identify a targeted network endpoint in a request and then dispatch the request to the appropriate host system for further processing (e.g., generating an inference).

In some embodiments, other provider network services, such as compute service(s) 270 and data storage service(s) 230 may be utilized for machine learning service 210. In other embodiments, these services may be implemented as internal systems of machine learning service 210. Compute service(s) 270 may implement various host systems 272, both as instances of a virtual computing services, for example, along with hosting on the instance one or more containers. These container/instances may be deployed on different physical computer systems with access to different hardware components, providing different performance capabilities. For example, different types or configurations of resources, including different amounts of processing capacity, memory, storage, and/or specialized hardware, such as GPUs, and tensor processor units (TPUs), systolic arrays, or various other types of hardware-based accelerators for machine learning computations) may be provisioned or otherwise obtained from compute service(s) 270 and then the machine learning model deployed to that provisioned host system and associated with a network endpoint (along with various software or other applications to support the receipt of requests for inferences and return inferences using one or more models, such as may be implemented in a container).

In some embodiments, other service(s) 240 may include a container registry service to store and provide both machine learning service 210 containers (e.g., ML development environment notebook server image, ML development environment kernel images, and ML computing resource images for deployment, as discussed below.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may include object or file data stores for putting, updating, and getting data objects or files, in some embodiments, one or more of which may be used for providing data storage to support machine learning service 210. For example, various machine learning models 232 may be stored and retrieved from data storage service 230 and loaded onto host systems, according to the various techniques discussed below, and associated with network endpoint(s) 224 or managed network endpoint(s) 226*a* (depicted as models 224*b* and models 226*b*). Data storage service 230 may be a file system service, store that allows for different data objects of different formats or types of data as respective file systems associated with an account or user(s) of machine learning service 210. In at least some embodiments, data storage service(s) 230 may be treated as a data lake. For example, an organization may generate many different kinds of data, stored in one or multiple collections of data objects in a data storage service 230. The data objects in the collection may include related or homogenous data objects, such as database partitions of sales data, as well as unrelated or heterogeneous data objects, such as image data files (e.g., digital photos or video files) audio files and web site log files. Data storage service(s) 230 may be accessed via programmatic interfaces (e.g., APIs) or graphical user interfaces.

Generally speaking, clients 250 may encompass any type of client that can submit network-based requests to provider network 200 via network 260, including requests for machine learning service 210 (e.g., a request to start machine learning task execution, etc.). For example, a given client 250 may include a suitable version of a web browser, or may include a plug-in module or other type of code module that can execute as an extension to or within an execution environment provided by a web browser. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., access requests to configure or perform machine learning tasks) via network 260, in one embodiment. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
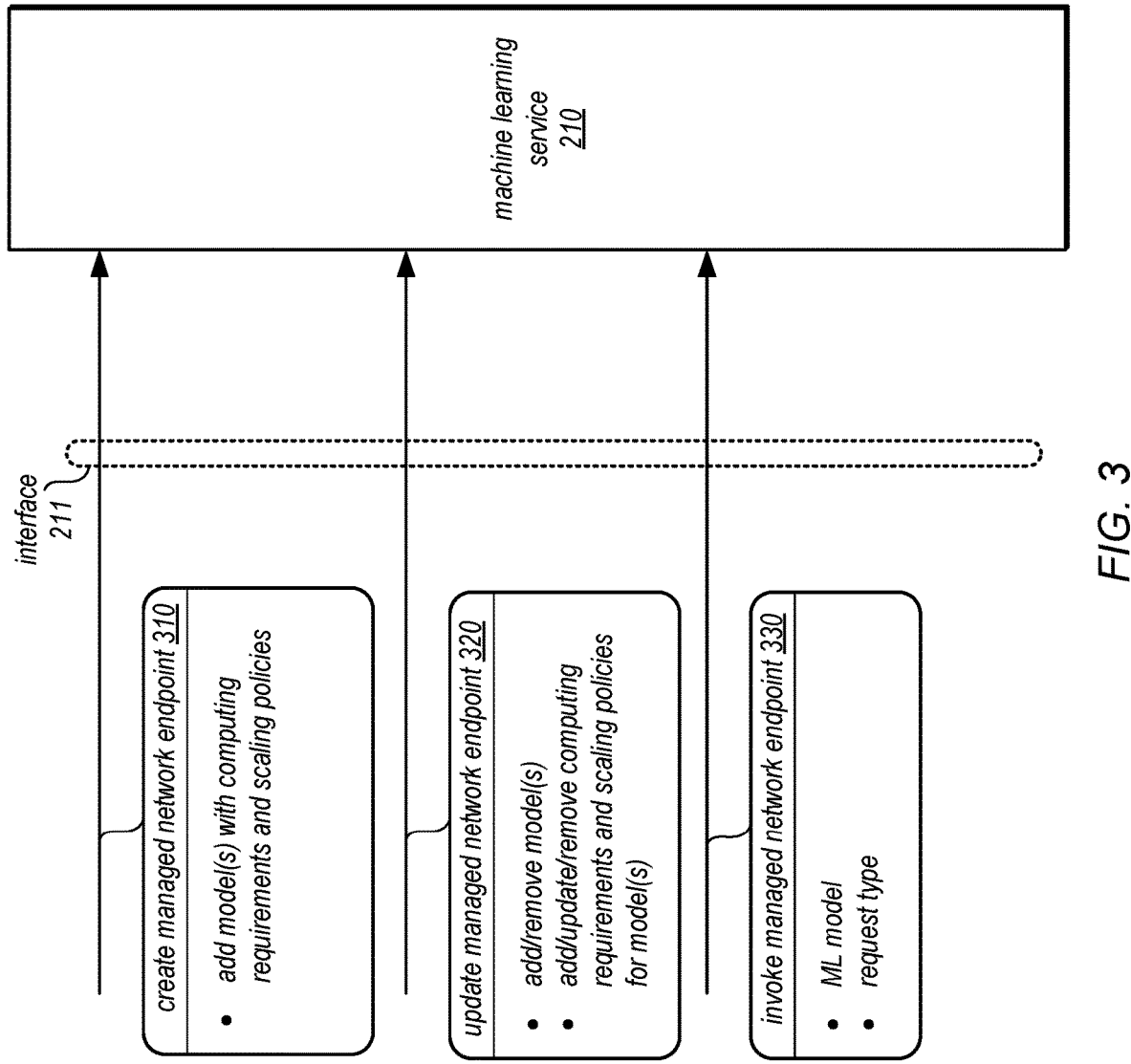
FIG. 3 is a logical block diagram that illustrates interactions for dynamic endpoint management for heterogeneous machine learning models, according to some embodiments.
Figure 4:
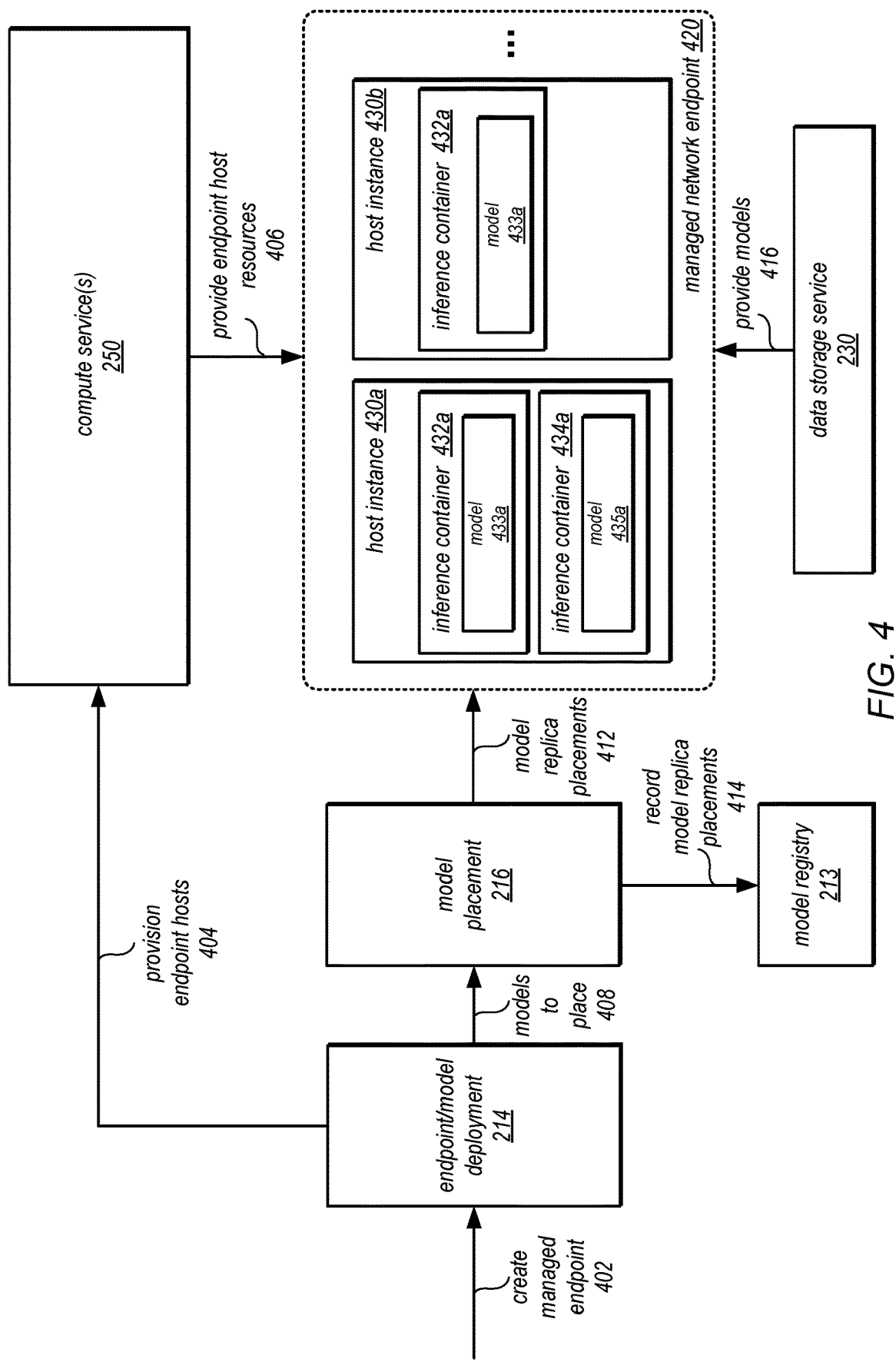
FIG. 4 is a logical block diagram that illustrates interactions to create a managed network endpoint, according to some embodiments.

FIG. 3 is a logical block diagram that illustrates interactions for dynamic endpoint management for heterogeneous machine learning models, according to some embodiments. Interface 211 may support various interactions to create, configure, and otherwise manage resources of machine learning service 210, including managed network endpoints. For example, one or more requests to create a managed network endpoint 310 may be support. Various features or parameters of the request 310 may include information used for dynamic endpoint management. For example, the request may create a new managed network endpoint, which may cause machine learning service to establish the various networking rules or components to direct requests to invoke machine learning models associated with the managed network endpoint to be deployed. Routers, load balancers or other networking components, for example, may be updated to include the new network endpoint. Metadata, such as at model registry 213, may be created and an indication that the network endpoint is a managed network endpoint (as opposed to non-managed network endpoint, like network endpoint(s) 224a in FIG. 2).

Other features of the managed network endpoint may be included in request 310. For example, one or more model(s) may be added. As discussed above with regard to FIG. 1, specific computing requirements (e.g., a number CPUs, GPUs, memory, or other hardware, including various accelerator devices) may be specified. Scaling policies specific to each model may also be specified (e.g., minimum number of replicas, maximum number of replicas, rate at which replicas can be scaled up or scaled down, etc.). Although not depicted, other performance objectives, such as availability objects accomplished by placing replicas of models in across multiple availability zones of provider network 200.

Figure 18:
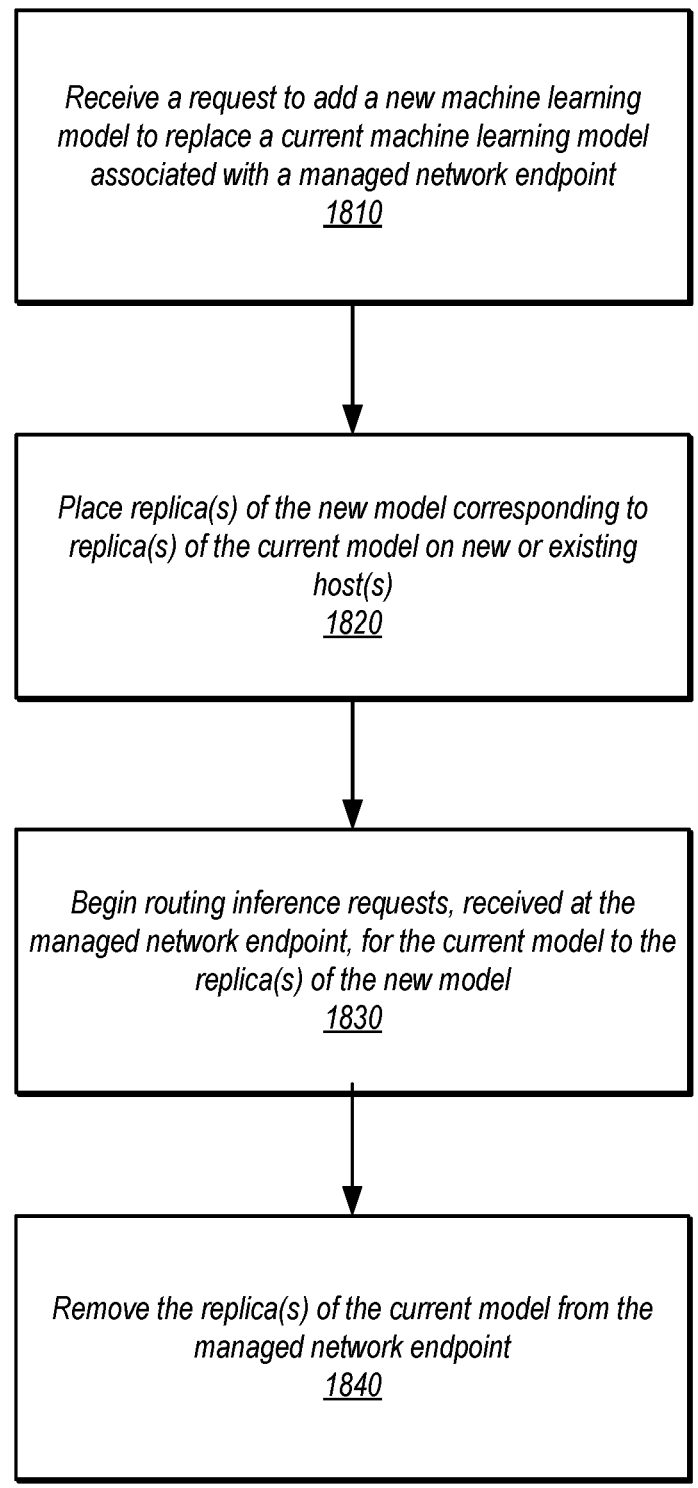
FIG. 18 is a high-level flowchart illustrating various methods and techniques for zero-downtime deployment of new models to a managed network endpoint, according to some embodiments.

One or more requests to update a managed network endpoint 320 may be supported via interface 211. For example, request 320 may include requests to add or remove model(s). In some embodiments, these requests may be to replace a model with an updated version, which may trigger batch (or patch) replacement actions that deploy the new models as replicas at new (or existing) host systems associated with a managed network endpoint before taking down/removing the current model replicas. In this way, zero downtime is experienced by client applications that invoked that model (but do not necessarily invoke a specific version of that model). FIG. 18, discussed below, provides further discussion of such techniques. Similarly, request 320 may include additions, updates, or removal of computing requirements and scaling policies for model(s). For example, support for scale down to zero replicas may be added (or removed) with an updated scaling policy. In some embodiments, removal of a scaling policy or computing requirement may cause machine learning service 210 to apply a service-determined scaling policy and computing requirement (e.g., a default policy or computing requirement or a dynamically determined one based on the historical use or predicted use of the model).

While requests 310 and 320 (and other similar requests) may be considered control plane 212 requests, data plane 220 requests may also be received via interface 211. For example, requests directed to managed network endpoint 330 may be received. These requests may specify the machine learning model to use to generate an inference. In some embodiments, the requests may have a request type (e.g., is the request associated with a streaming interaction, sticky session, or other interaction that may be desirable to handle differently by directing the request to the same host/model as a previous request 330.

The above interactions with interface 211 are merely provided as examples. Other combinations of requests with the same or different parameters may be used to perform similar features. For example, a request to create a managed network endpoint may be separate from requests to add models which may be separate from requests to specify scaling policies or computing requirements.

FIG. 4 is a logical block diagram that illustrates interactions to create a managed network endpoint, according to some embodiments. A request is received to create a managed network endpoint, as indicated at 402. This request may be handled by endpoint/model deployment 214, which may assess the initial resource needs according compute requirements and/or other performance objectives and provision 404 a number of endpoint hosts from compute service(s) 250. This may include specifying particular host types (e.g., particular instance types) with access to particular hardware or other computing resources that satisfy the specified computing requirements for different models (e.g., sufficient GPUs, memory, or particular hardware accelerators). Compute service(s) 250 may provide the endpoint host resources, as indicated at 406 for managed network endpoint 420.

Models to place 408 may be indicated to model placement 215. Model placement 216 may evaluate the available host systems (e.g., by access associated host instance 430a and 430b metadata in model registry or another metadata store in machine learning service 210 (not illustrated) to obtain this information. Model placement 216 may apply placement technique that starts from minimum placement requirements and works toward more optimal placement considerations based on performance, efficient utilization, and availability as discussed above with regard to FIG. 1. For example, model placement 216 may first consider the specified computing requirements and ensure that, at a minimum, a host instance can meet the computing requirements for the model (e.g., to achieve performance objectives for the model). Further considerations, such as availability (e.g., does the model need to be placed in a particular location, such as an availability zone) and/or can the model be placed on an underutilized host instance (e.g., to improve utilization of that host instance without overburdening that host instance) may also be evaluated by model placement 216.

As indicated at 412, model placement 216 may make replica placements, including whether multiple replicas of a model are to be placed. For example, model 433a may have a replica at both host instance 430a and 430b. Other models, such as model 435a, may have a single replica. As depicted in FIG. 4, replicas may be placed as a single replica per inference container, such as inference containers 432a and 434a. In some embodiments, multiple models may be executed in a single container. As indicated at 416, data storage service 230 may provide the artifacts for models to be loaded into their respective host instance/containers for execution. Model placement 216 may update model registry 213 to include placement of replicas for the managed network endpoint 420. Other information may be included, such as the scaling policies or computing requirements applicable to each model (which may be used for subsequent placement and management tasks for managed network endpoint 420).

The interactions illustrated above with regard to FIG. 4, may be similar to those made to add new models to a managed network endpoint that is already in operation. Model placement 216 may make a similar placement evaluation and select a host instance. If a suitable host is not available (e.g., does not meet computing requirements, endpoint/model deployment 214 may be tasked with provisioning one that does meet computing requirements from computing service 250 and associating it with managed network endpoint 420. Similar interactions may also be made with respect to patching or batch operations for deploying multiple replicas of a new model or updating multiple replicas of an existing model to a new version. For example, the new version of a deployed model may be placed as a number of replicas in host instances in network endpoint before removing existing replicas of a current version of the deployed model.

Figure 5:
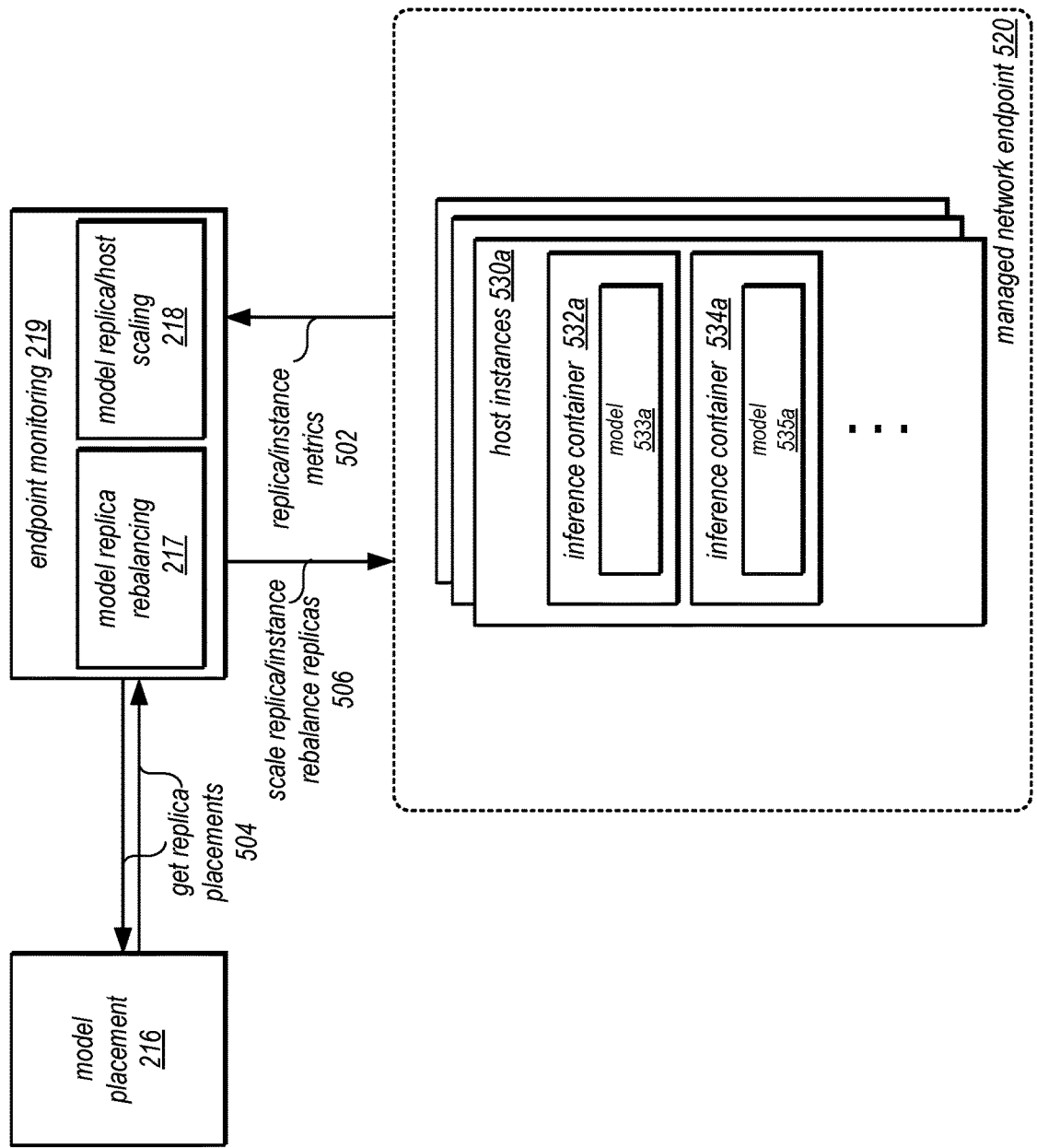
FIG. 5 is a logical block diagram for monitoring a managed network endpoint for dynamic endpoint management for heterogeneous machine learning models, according to some embodiments.

Some management tasks may be triggered by monitoring or other automated evaluations of managed network endpoints, separate from those tasks discussed above which may be triggered by requests to perform different actions with respect to a managed network endpoint. FIG. 5 is a logical block diagram for monitoring a managed network endpoint for dynamic endpoint management for heterogeneous machine learning models, according to some embodiments. Endpoint monitoring 219 may be implemented as part of endpoint management 215 to proactively address potential failure or other performance problems and maintain or improve performance, efficient utilization, and availability objectives for models associated with a managed network endpoint.

Replica/instance metrics 502 may report various performance and utilization measures for individual replicas of a model and their respective host instances. Some metrics may include various computing resource utilization metrics, such as CPU utilization, GPU utilization, memory utilization, reservations, disk or other storage utilization, and inference performance metrics, such as number of invocations per replica, number of invocation errors, replica latency. In some embodiments, these metrics may be aggregated on a per-model basis (e.g., number of invocations per model, average CPU utilization, GPU utilization or other resource utilization). At least some of these replica/instance metrics 502 may be published or shared with users of machine learning service 210 (e.g., using a provider network metrics service which can display or otherwise visualize metrics, including metrics monitoring services that may trigger alarms or other notifications based on received metrics).

Endpoint monitoring 219 may implement model replica rebalancing 217, which may examine the placement and performance of model replicas 533a and 535a in inference containers 532a and 534a across host instances 530a to ensure efficient utilization of hosts 530a of managed network endpoint 520. Model replica rebalancing 217 may apply various criteria to identify determine whether to move one or more replicas to other host instances 530a of a managed network endpoint 520. For example, model replica rebalancing may look for underutilized host instances 530a. The utilization metrics of metrics 502 may be compared with minimum utilization thresholds. If a host instance is under the minimum utilization threshold, then the host instance may be identified as underutilized. A similar analysis may be made for overutilized instances, where the workload for performing inference requests may be causing performance degradation. This overutilization condition may be sometimes referred to as heat. Other instances of unhealthy or poor placement may be indicated by performance metric such as number of errors or latency of inferences. Thus, rebalancing events may be triggered for performance when various criteria (e.g., thresholds) analyzing these metrics are satisfied.

To handle these detected rebalancing events, model replica rebalancing 217 may get replica placements 504 to move replicas. In some embodiments, model placement 216 may return possible placements which model replica rebalancing 217 may confirm before initiating (as indicated at 506). In this way, model replica rebalancing 217 can determine whether a placement improves the situation (e.g., does moving a replica to another host instance cause that host system to be overutilized). In some scenarios, rebalancing events may not be performed due to lack of an alternative placement location. In some embodiments, rebalancing events may work in coordination with host scaling 218, which may allow for a new host to be added and then perform rebalancing to move a replica after the host instance is added to managed network endpoint.

Endpoint monitoring 219 may implement model replica/host scaling 218. Model replica host scaling 218 may evaluate the replica/instance metrics 502 with respect to scaling policies specified for models. If, for example, a model scaling policy specifies thresholds or conditions when further replicas of a model should be added (or removed), then model replica/host scaling 218 may detect scaling events, triggering scaling actions. For instance, if the number of requests for a model in a time period exceeds a threshold number (or some other criteria, such as average latency for model requests), then another one (or more) replicas may be added in accordance with the scaling policy for that model (e.g., which may specify the rate at which replicas are to be added along with a maximum number of replicas for the managed network endpoint). Likewise, a scaling policy may indicate when a number of replicas can be scaled down based on various criteria with respect to the replica metrics 502. Replica scaling may get replica placements 504 from model placement 216 when new replicas are being added to managed network endpoint.

In addition to model replica scaling, host scaling may also be performed. For example, model/replica host scaling 218 may determine when an underutilized host instance 530a can be removed from managed network endpoint 520. This may also trigger rebalancing 217, in some scenarios. Likewise, if managed network endpoint 520 is experiencing high workloads and host instance(s) 530 are experiencing heat that cannot be relieved by replica rebalancing, then an event to increase the number host systems may be triggered. Host scaling, like replica scaling, may be subject to scaling policies. In this way, automated scaling techniques do not scale to high (or to low) ignoring other concerns (e.g., cost).

Figure 6:
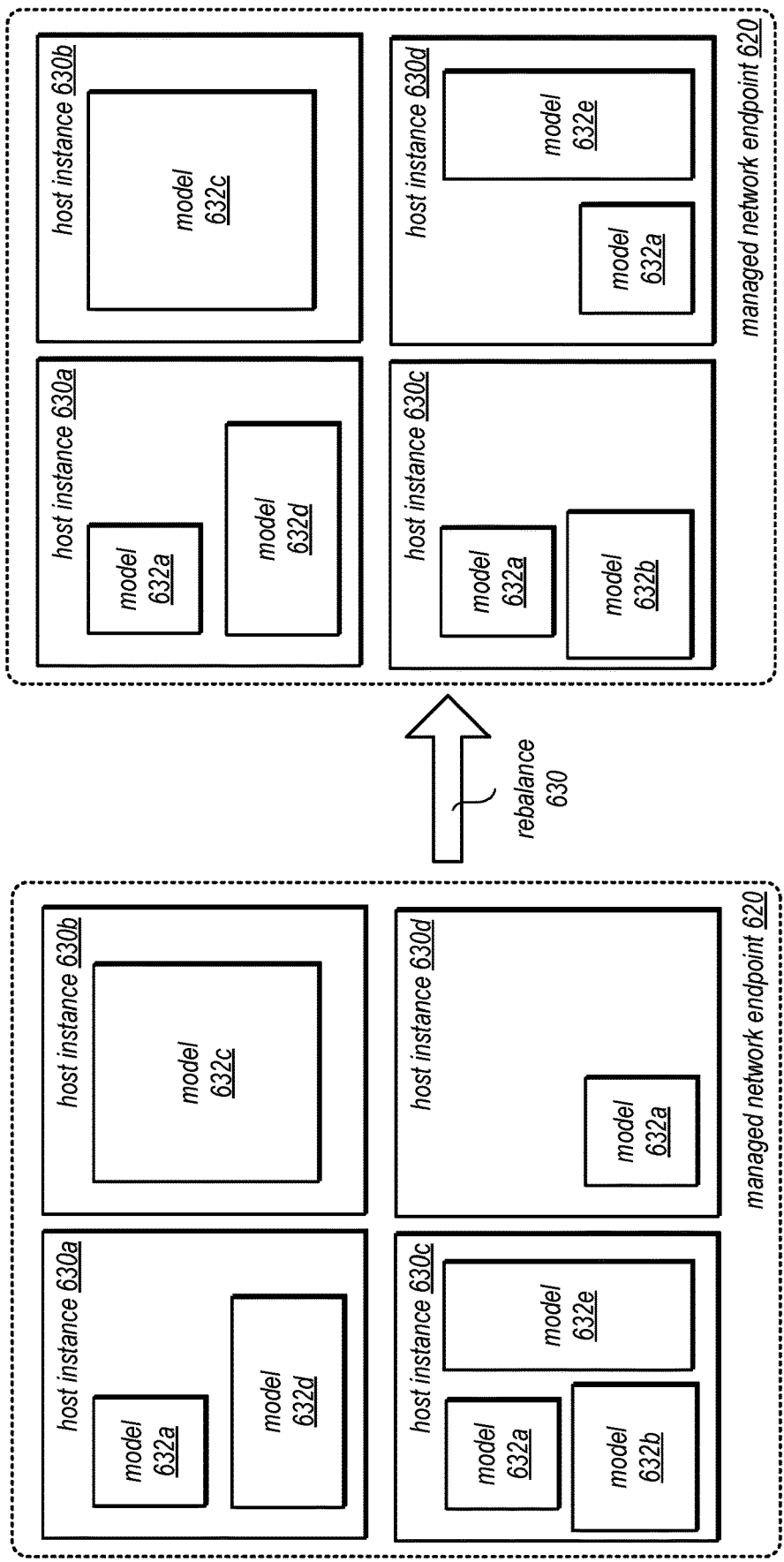
FIG. 6 is a logical block diagram of a rebalancing event, according to some embodiments.

The following discussion illustrates different example rebalancing and scaling scenarios. The illustrated examples do not depict all possible rebalancing and scaling actions that may be taken with respect to a managed network endpoint. FIG. 6 is a logical block diagram of a rebalancing event, according to some embodiments. Managed network endpoint 620 may include host instances 630a, 630b, 630c and 630d. Model replicas 632a and 632d may be hosted at instance 630a, model replica 632c may be hosted at host instance 630b, model replicas 632a, 632b and 632e at host instance 630c, and model replica 632a at host instance 630d. Endpoint monitoring 219 may recognize that host instance 630d is underutilized. Alternatively, endpoint monitoring 219 may recognize that host instance 630c is overutilized (both conditions can be true as well). In this scenario, a rebalance may be performed as indicated at 630. In this way, model replica 632e may be moved to host instance 630d. To make the move, host instance 630c may unload or otherwise no longer perform inference requests for model 632e. Routing 222 may be updated (e.g., via model registry 213 as discussed in detail below with regard to FIG. 11). Host instance 630d may implement a service agent, container, or other application (not illustrated) which may access the model artifacts (and container if needed) from other service(s) (e.g., storage service 230) to load model 632e and begin performing inference requests for model 632e.

Figure 7:
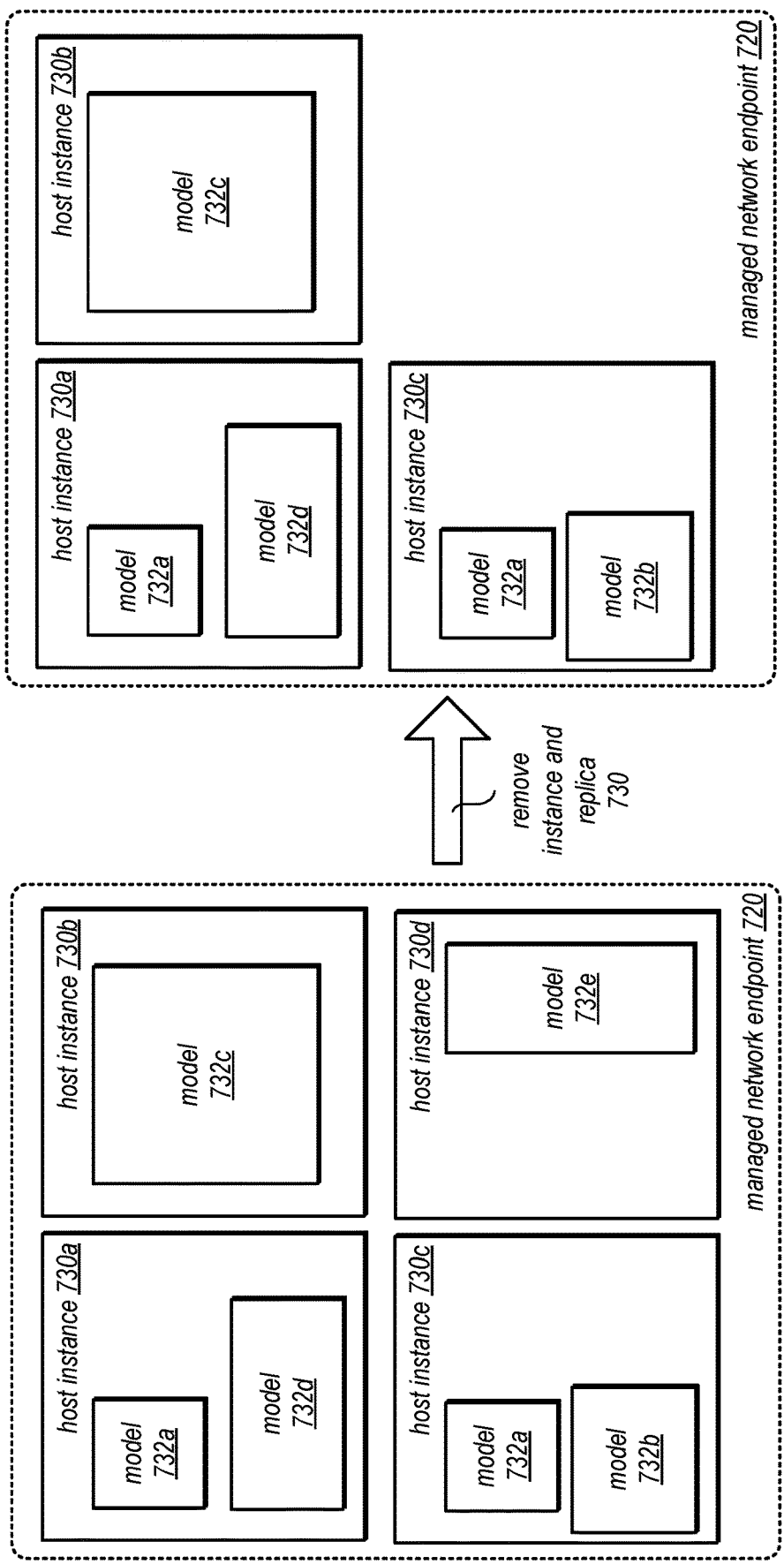
FIG. 7 is a logical block diagram of a scale down event, according to some embodiments.

FIG. 7 is a logical block diagram of a scale down event, according to some embodiments. Managed network endpoint 720 may include host instances 730a, 730b, 730c and 730d. Model replicas 732a and 732d may be hosted at instance 730a, model replica 732c may be hosted at host instance 730b, model replicas 732a and 732b at host instance 730c, and model replica 732e at host instance 730d. Endpoint monitoring 219 may recognize that host instance 730e is underutilized. For example, model 733e may have received no inference requests in a prior period of time (e.g., in 24 hours). In this scenario, a removal of both instance and replica may be performed as indicated at 730. In this way, model replica 732e is no longer actively hosted at managed network endpoint 720 (even if it is still associated with managed network endpoint 720). Removal of host instance 730d may be performed by releasing the host back to computing service 250 (e.g., de-provisioning or terminating the instance). Routing 222 may be updated (e.g., via model registry 213 as discussed in detail below with regard to FIG. 11) to indicate that host instance 730d and model 732e are no longer available.

In at least some embodiments, removal of a model replica leaving the model with no replicas presently hosted for a model may be considered a "scale down to zero" feature, which may have to be explicitly authorized by a scaling policy for that model. If not authorized, then model 732e could be moved to another host instance instead of being removed. Scaling policies for models that allow scale down to zero may also specify when and how they may return to being hosted (e.g., when one inference request is received or when a larger number of inference requests are received, after a cool down period of time, etc.). If an inference request comes in for the model with no replicas, the scaling policy may also indicate how that request is to be handled (e.g., queued until the model is added back to managed network endpoint or failed with an error indicating the model is not present and if/when it will be present again at the network endpoint).

Figure 8:
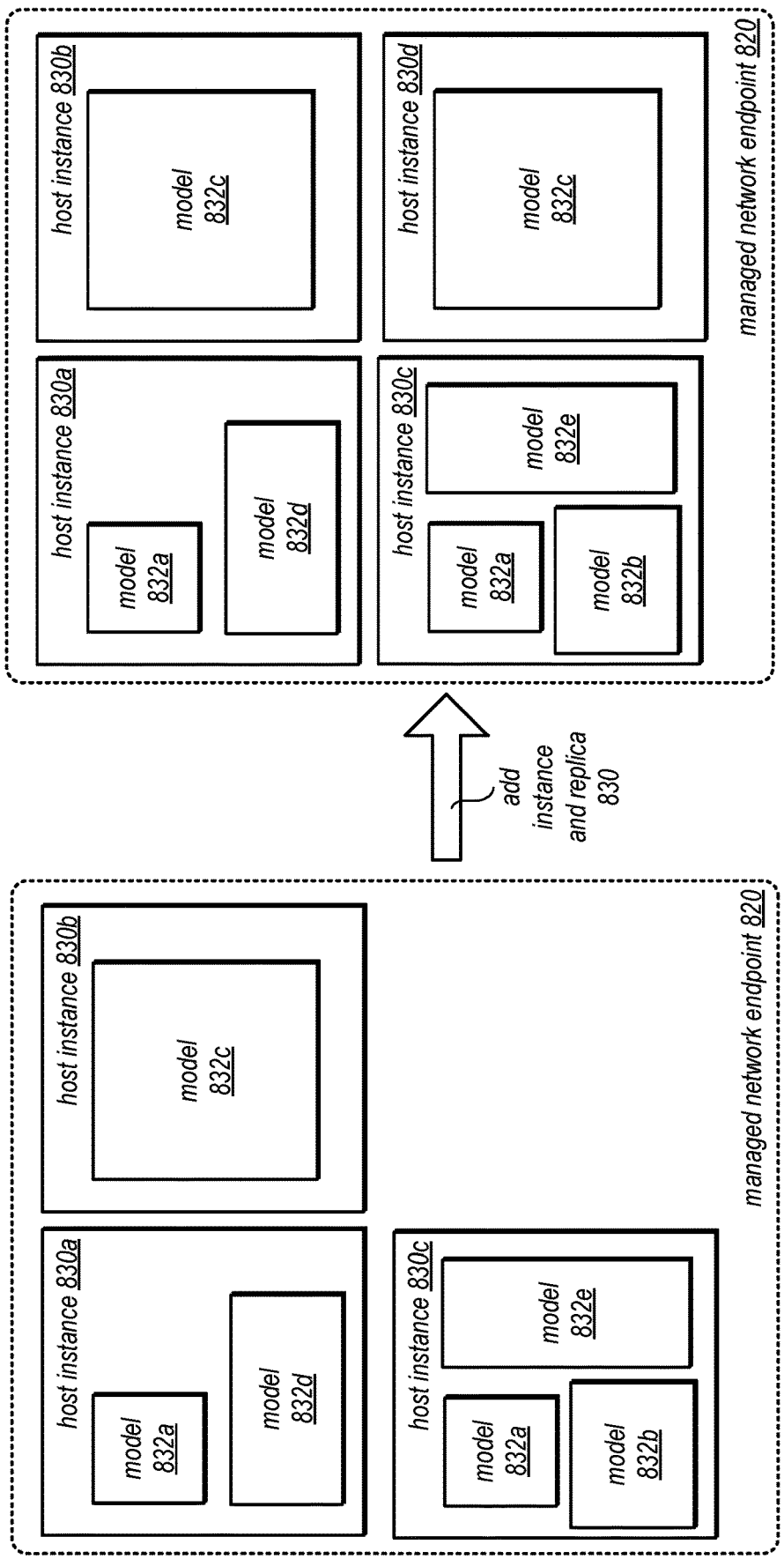
FIG. 8 is a logical block diagram of a scale up event, according to some embodiments.

FIG. 8 is a logical block diagram of a scale up event, according to some embodiments. Managed network endpoint 820 may include host instances 830a, 830b, 830c and 830d. Model replicas 832a and 832d may be hosted at instance 830a, model replica 832c may be hosted at host instance 830b, model replicas 832a, 832b and 832e at host instance 830c, and model replica 832a at host instance 830d. Endpoint monitoring 219 may recognize that another replica of model 832c is needed. For example, the number of requests served by replica of model 832c exceeds a threshold for scaling up (or average latency for inference requests exceeds a latency threshold). A determination may be made that other instances in the managed network endpoint do not have computing resources sufficient to satisfy a computing requirement specified for model 832c. In this scenario, an instance may be added in addition to adding a replica of model 832c, as indicated at 830. If an instance were available, then it may be that just the replica is added. New host instance 830d may be provisioned form computing service 250 and associated with managed network endpoint 820. Then host instance 830d may be instructed to load model 832c. Routing 222 may be updated (e.g., via model registry 213 as discussed in detail below with regard to FIG. 11). Host instance 830d may implement a service agent, container, or other application (not illustrated) which may access the model artifacts (and container if needed) from other service(s) (e.g., storage service 230) to load model 832c and begin performing inference requests for model 832c.

Some machine learning model types may offer further optimization opportunities, both for managed network endpoints and in other scenarios (e.g., network endpoints 224a which are not managed). Fine-tuned machine learning models is one type of machine learning model that can offer further placement an inference performance optimizations. Fine-tuning may refer to techniques to adapt the features of a previously trained machine learning model (e.g., the weights) according to additional training data that may "tune" or otherwise adapt the trained machine learning model's performance to specific uses or scenarios included in the additional training data. For example, a computer vision model that performs object classification generally may be tuned to recognize a particular category of objects, such as traffic signs, in image data. However, there may be scenarios where fine-tuning of a trained machine learning model is desirable, but modification of the trained machine learning model itself is not supported or allowed due to access restrictions.

For example, some machine learning models are developed as the result of significant technological effort and resource costs. Appropriate data sets may have to be curated and the architecture of the machine learning model designed to provide a high-performing machine learning model. Some of these machine learning models can be extremely large using, for instance, billions of parameters, allowing the model to be adaptable to a wide category of use cases and tasks, such as text and image generation and summarization. These machine learning models, which are sometimes referred to as "foundation models", may perform well without any adaptation. However, in many scenarios, better performance can be achieved if the models are fine-tuned to specific uses cases. Given the technological efforts and resource costs expended to develop and train these machine learning models, model providers may impose access restrictions on the content of the models (e.g., the weights of model parameters), as it would otherwise have to surrender proprietary model information if the content of the models were to be accessible.

For fine-tuned machine learning models that do not alter the initially trained model, which may be referred to as the "base" model, a "delta" model which implements the tuning aspects may be used in conjunction with the based model to make a version of a fine-tuned models. In some embodiments, many different versions of the same base model can be deployed using different delta models.

Various different types of fine-tuning techniques can be performed to produce these delta models, such as Parameter Efficient Fine-Tuning (PEFT) techniques, in some embodiments. Parameter efficient fine-tuning refers to a set of fine-tuning techniques that do not require updating all the model weights. Instead, just a subset of the weights are updated. A notable component of PEFT methods only fine-tune a small number of (extra) model parameters. The following are some examples of PEFT techniques.

LoRA: Low Rank Adaptation is a technique where the pre-trained weights from the provided machine learning model are frozen and a smaller set of incremental weights are trained using the tuning data set. During inference, the results of the incremental weights are added to the frozen ones. LoRA can yield better results than incremental fine-tuning and be faster to fine-tune.

AdaLoRA: LoRA but with an adaptive learning rate that adjusts based on the curvature information of the loss landscape.

Prefix Tuning: The idea behind prefix-tuning is to optimize a continuous vector that is prepended to the input of a language model. This vector, also known as a "prefix", is used to guide the model's generation process. Prefix-tuning only adjusts the prefix, leaving the rest of the model parameters fixed.

P-Tuning: A set of trainable parameters (P) as additional tokens are introduced at the beginning of the input sequence. These parameters are learned during the fine-tuning process and are task-specific.

Prompt Tuning: A mechanism for learning "soft prompts" to condition frozen language models to perform specific downstream tasks from labeled examples.

RLHF: Leveraging reinforcement learning to "teach" a model with a reward model tuned on human feedback data.

Figure 9:
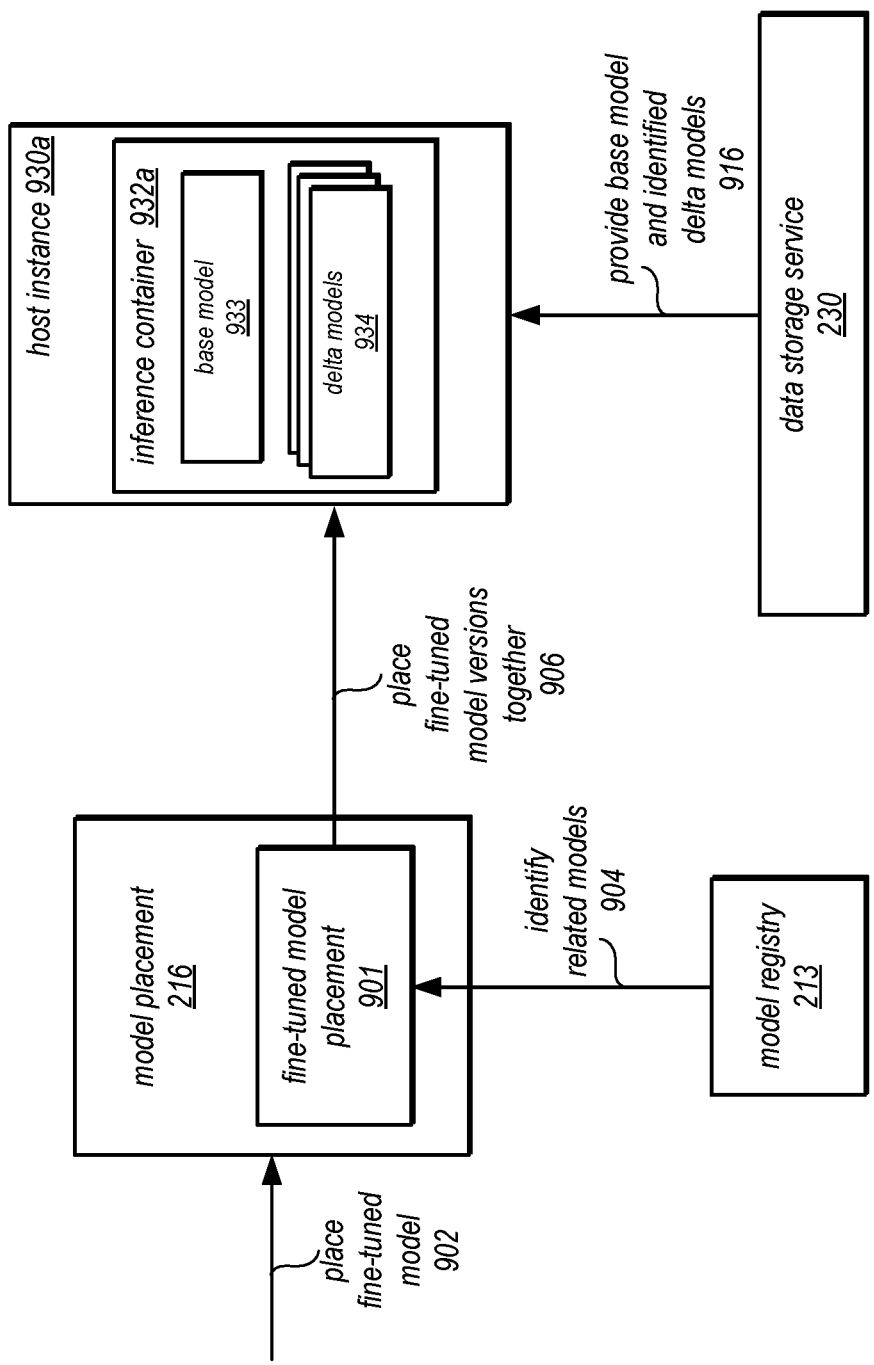
FIG. 9 is a logical block diagram of fine-tuned model placement, according to some embodiments.

Placement of base and delta models may be optimized so that they are co-located on a same host system. Such placements improve performance of inference requests (e.g., no network hops between inference generation steps for different models), further optimization may be made by sharing a common base model with multiple different versions of that based model tuned differently using different delta models. These techniques may be applicable to more than managed network endpoints. For instance, a non-managed network endpoint or other machine learning system or service may want to place base and delta models together to achieve this performance improvement. Because base models can be very large, using a single copy with multiple delta models achieves significant resource savings, both in storage and computational resources (when compared with having a copy of a base model paired with every delta model). The savings grow large when a single base model is used with hundreds or thousands of delta models that tune it the base model for different tasks. FIG. 9 is a logical block diagram of fine-tuned model placement, according to some embodiments.

As depicted in FIG. 9, model placement 216 may implement fine-tuned model placement optimization 901 for handling a request to place a fine tuned model 902. The placement request may be for a base model or a delta model. Fine-tuned model placement 901 may access model registry 213 to identify related models 904. For example, delta models may include, as part of model metadata in registry 213, an indication that the model is a delta model and a model identifier for the base model that the delta model fine-tunes. Accordingly, when model placement does make a placement decision for the fine-tuned model, it may account for any related models (e.g., placing a delta model with an already placed base model, identifying and obtaining delta model(s) to place when the base model is received for placement). Other placement considerations may still be made with respect to computing requirements, performance, efficient utilization and availability (as discussed above with regard to FIG. 1), in some embodiments.

For example, as depicted in FIG. 9, host instance 930a may include inference container 932a which may execute inferences using base model 933 and one (or more of delta models 934. The identified delta models and base model may be provided, as indicated at 916, from data storage service 230, in some embodiments.

Figure 10:
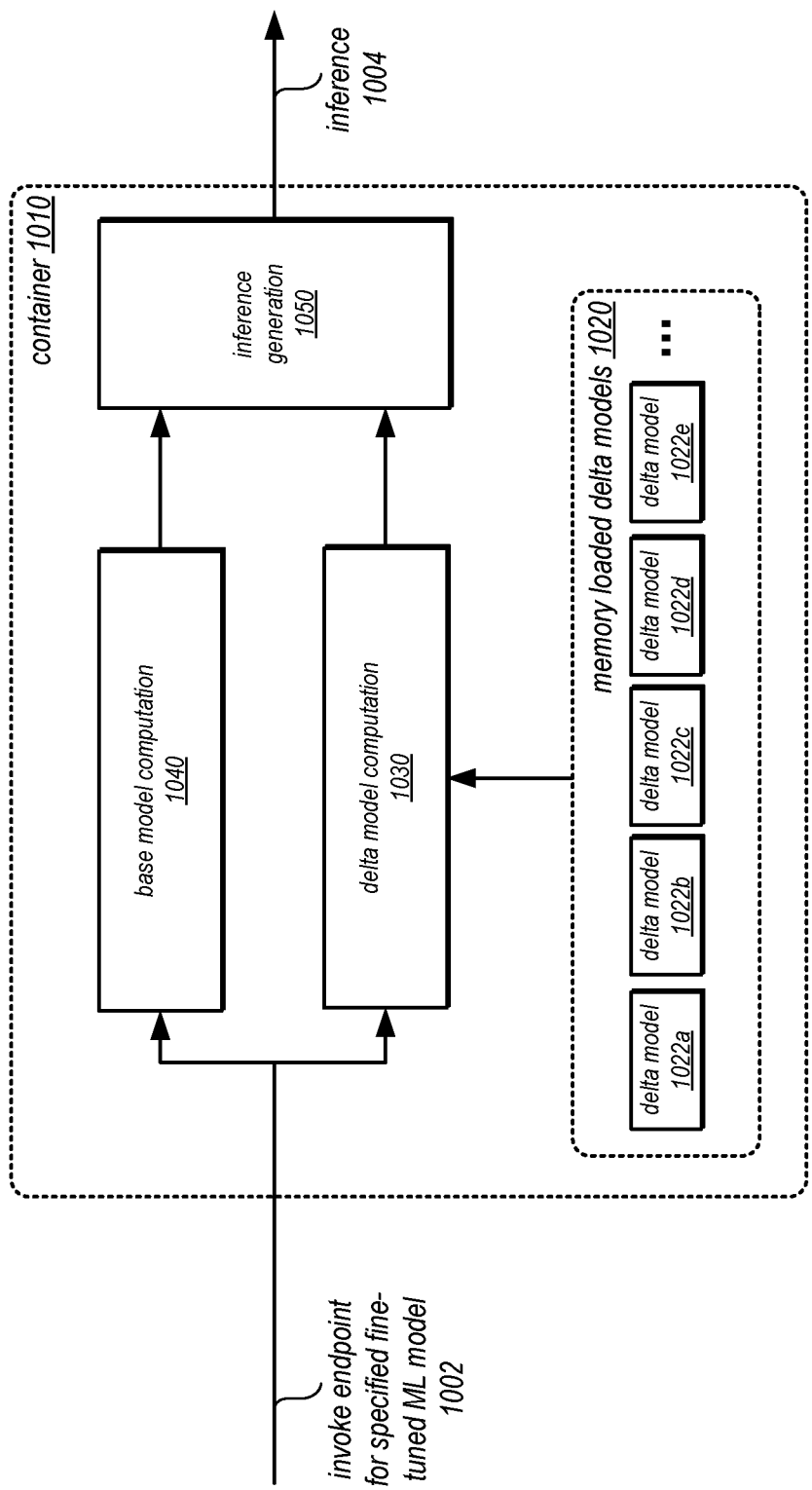
FIG. 10 is a logical block diagram of loading delta models in memory for generating inferences for fine-tuned machine learning models, according to some embodiments.

Further performance improvements can be achieved by co-locating multiple delta models with a base model at inference generation time. FIG. 10 is a logical block diagram of loading delta models in memory for generating inferences for fine-tuned machine learning models, according to some embodiments. Container 1010 may receive a request that invokes the endpoint for a specified fine-tuned ML model, as indicated at 1002. The specified version of the ML model may be produced using one of the delta models 1022a, 1022b, 1022c, 1022d, and 1022e of memory loaded delta models 1020. Because delta models are loaded into memory, there is minimal to none downtime for switching between different versions of a fine tuned model. Instead, the delta values may be computed at 1030 according to the different model tuning techniques discussed above and combined with the base model computation values generated at 1040 to complete inference generation at 1050 and provide inference 1004. This technique offers several performance improvements, such as decreased latency when generating the inference (e.g., in-memory delta models can be quickly applied to generate input values). Additionally, concurrent requests for different fine-tuned versions of the model can be handled. For example, the same input can be used to generate different delta values using different delta models while the base model computation 1040 is performed, allowing for the base values to be reused to produce different tuned version inferences using the different sets of delta weights.

As discussed above with regard to FIG. 1, load aware routing techniques may be implemented for a managed network endpoint. In this way, routing decisions between multiple replicas can be made to optimize throughput of inference requests and prevent unnecessary rebalancing and scaling actions from being performed. Accordingly, load aware load balancing for a managed network endpoint offers improves the performance of a managed network endpoint to make more efficient use of existing model replicas and hosts. FIG. 11 is a logical block diagram of load aware routing techniques for a managed network endpoint, according to some embodiments.

Router(s) 1160 may be implemented as part of routing layer 222. Routers 1160 may be assigned to one (or multiple) managed network endpoints, in some embodiments. Router(s) 1160 may utilize a model deployment cache 1162, which may store information about model replicas and host instances associated with managed network endpoints. For example, managed network endpoint 1110 may include a number of host instances, such as host instances 1120, 1130 and 1140. These host instances may host a number of model replicas, such as model replicas 1150a, 1150b, 1150c, and 1150g. Host instances may also include respective service host agents 1122, 1132 and 1142, which may report various performance metrics and handle requests to dispatch inference requests to the appropriate model replica.

Managed network endpoints, like endpoint 1110, are dynamic. As discussed in detail above, various movements, scale ups, downs, and rebalancings may occur. While router(s) 1160 may maintain a local cache 1162, model registry 213 may serve as a source of truth for endpoints, as endpoint management 219 may update model registry with various changes 1101. Therefore, router(s) 1160 may periodically request model placement information 1164 and obtain model placement information to update cache 1162 (or when the cache information is erroneous or missing for a particular replica).

As discussed in detail below with regard to FIGS. 16 and 17, load aware routing techniques may make use of various workload metrics or information about hosts and model replicas in order to make routing decisions. When an invocation for a specified ML model is received, as indicated at 1102, model deployment cache 1162 may be accessed and used, if the model is present in the cache, to determine and select a host instance that hosts a replica of the invoked model. As with model 1150a, multiple host instances may be considered. Workload information, such as the various performance metrics discussed above with regard to FIG. 5 may be considered (e.g., resource utilization, inference performance, etc.). Different selection strategies may be implemented, one of which may be specified in configuration request (e.g., 320) for managed network endpoint 1110. In some embodiments, inflight inference requests (e.g., ongoing inference requests that have not yet been returned to a client), as indicated at 1105, may be used to make selections between instance hosts that both store a replica of a model. As discussed with regard to FIG. 17, sticky sessions or other associations between a particular client and host instance may be maintained in order to ensure that streaming sessions or other types of interactions that involve multiple inferences/responses based on prior responses/inferences (e.g., stateful interactions) may be supported without having to replay or obtain state information to continue.

Although FIGS. 2-11 have been described and illustrated in the context of a provider network implementing a machine learning service, the various components illustrated and described in FIGS. 2-11 may be easily applied to other machine learning systems that can implement network endpoint management for heterogeneous machine learning models. As such, FIGS. 2-11 are not intended to be limiting as to other embodiments.

Figure 12:
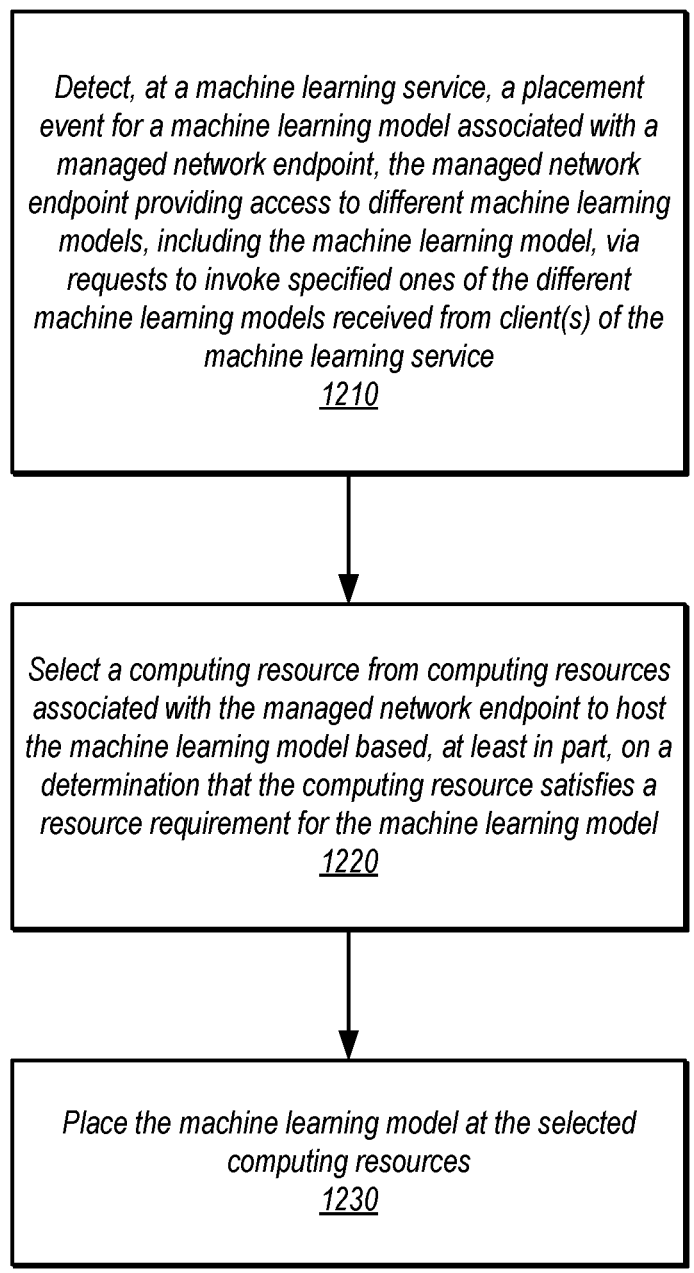
FIG. 12 is a high-level flowchart illustrating various methods and techniques for dynamic endpoint management for heterogeneous machine learning models, according to some embodiments.

FIG. 12 is a high-level flowchart illustrating various methods and techniques for local computing resource creation for performing machine learning tasks, according to some embodiments. As indicated at 1210, a placement event for a machine learning model associated with a managed network endpoint may be detected. As discussed above, a managed network endpoint may provide access to different machine learning models, including the machine learning model, via requests to invoke specified ones of the different machine learning models received from client(s) of the machine learning service. Placement events may be triggered/requested by various actions with respect to a managed network endpoint. For example, requests to add a new model (or add a new version of a model), may trigger a placement event. Automated management operations for managed network endpoint, such as scaling and rebalancing, discussed above and below with regard to FIG. 13, may cause a placement event.

As indicated at 1220, a computing resource from computing resources associated with the managed network endpoint may be selected to host the machine learning model based, at least in part, on a determination that the computing resource satisfies a resource requirement for the machine learning model, in some embodiments. For example, the selection technique may first consider the specified computing requirements and ensure that, at a minimum, a computing resource (e.g., a host instance) can meet the computing requirements for the model (e.g., to achieve performance objectives for the model). Further considerations, such as availability (e.g., does the model need to be placed in a particular location, such as an availability zone) and/or can the model be placed on an underutilized computing resource (e.g., to improve utilization of that host instance without overburdening that computing resource) may also be evaluated. In some embodiments, optimization techniques may be used to choose between multiple options (e.g., if more than two hosts can satisfy the computing requirements). For example, a bin packing technique may be used (e.g., best fit, next fit, etc.). Other placement optimization techniques, including machine learning placement techniques or simulating proposed placements to determine their impact on subsequent placement options may be alternatively or additionally implemented.

As indicated at 1230, the machine learning model may be placed at the selected computing resources, in some embodiments. For example, the host system may be instructed to obtain the machine learning model and mapping information for routing and/or other features (e.g., managed network endpoint management operations) may be updated to reflect the placement.

In some embodiments, no placement may be available. An error or other indication may be returned to, for example, a client (e.g., endpoint management 219) indicating that no host is available for placement, which may trigger other actions such as adding a new host to the managed network endpoint.

Figure 13:
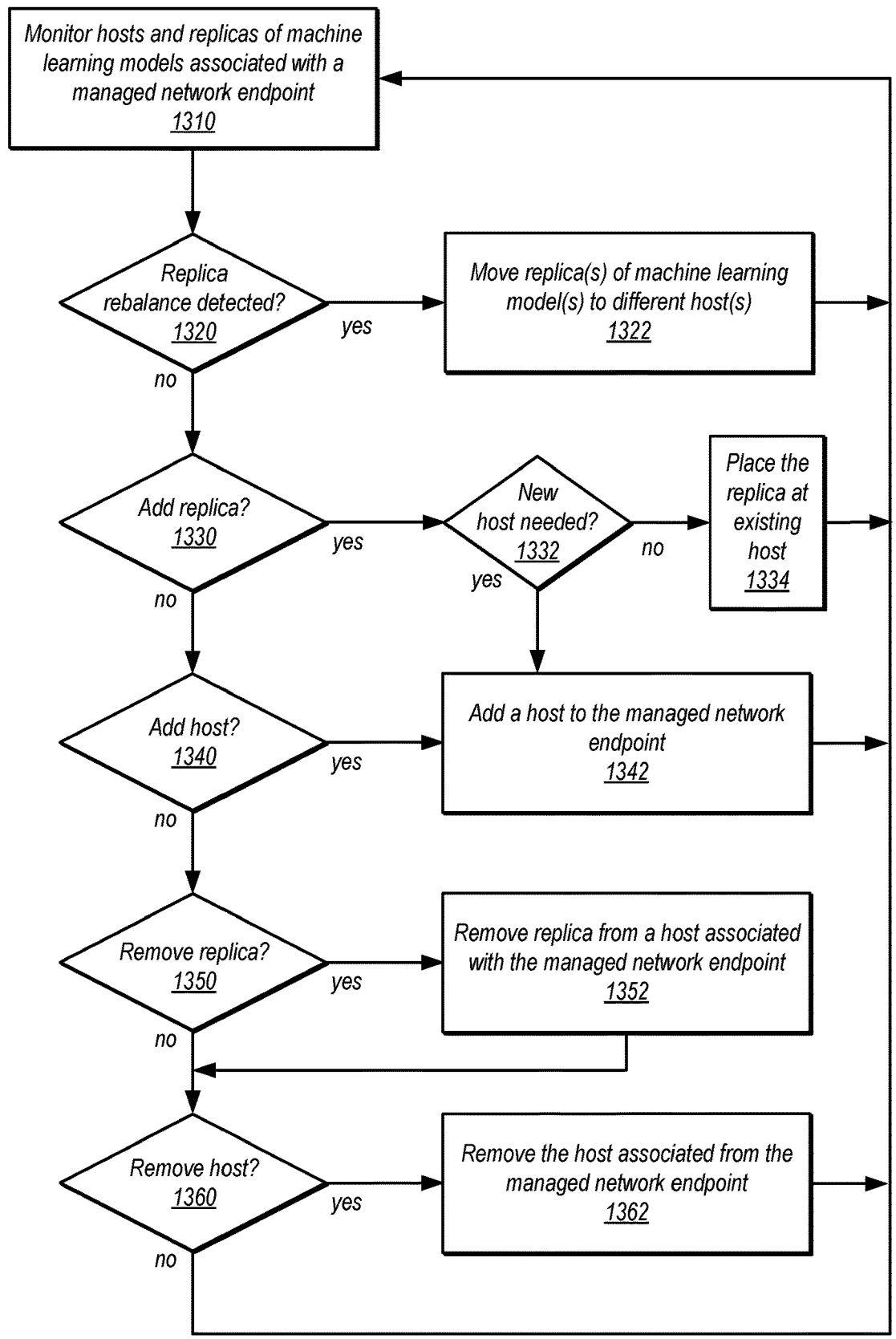
FIG. 13 is a high-level flowchart illustrating various methods and techniques for detecting scaling and rebalancing events, according to some embodiments.

Placement may be implicated in various management operations for a managed network endpoint. FIG. 13 is a high-level flowchart illustrating various methods and techniques for detecting scaling and rebalancing events, according to some embodiments. As indicated at 1310, host and replicas associated with a managed network endpoint may be monitored for various management operations, in some embodiments. As discussed above, various performance metrics for individual replicas, hosts systems (which may have multiple replicas), and aggregate metrics for all replicas of a model may be monitored and evaluated for different management tasks.

For example, as indicated at 1320, an evaluation may be performed to determine whether a replica rebalancing event is detected, in some embodiments. Underutilized, overutilized, and unhealthy hosts may be detected, which may cause a rebalancing event to be detected. If so, as indicated at 1322, one or more replicas may be moved to one or more different hosts associated with the managed network endpoint, in some embodiments. As discussed above with regard to FIG. 12, a placement decision may be made for these respective moves.

As indicated at 1330, an evaluation of the performance metrics may be performed to determine that a replica of a machine learning model may be added, in some embodiments. For example, scaling policies for replicas may indicate that if replica usage meets some criteria (or performance meets some criteria, such as failing to achieve an average latency or other performance goal), then one (or more) replicas should be added to the managed network endpoint. If so, a determination as to whether a new host is needed may also be performed, as indicated at 1332. If not, then as indicated at 1342, a host may be added to the managed network endpoint, in some embodiments. If so, then the replica may be placed at an existing host, as indicated at 1334.

As indicated at 1340, an evaluation of performance metrics may be made as to whether an event to scale up the number of hosts, adding a host, in some embodiments. For example, an overutilized host may need to be relieved and no other hosts may be available, so a new host may be added. Alternatively, a replica may needed and no host available. If so, as indicted at 1342, the host may be added to the managed network endpoint, in some embodiments.

As indicated at 1350, an evaluation of performance metrics as to whether a replica of a machine learning model may be removed, in some embodiments. For example, scaling policies for replicas may indicate that if replica usage falls below some criteria (or performance meets some criteria, such as failing to achieve an average latency or other performance goal), then one (or more) replicas should be removed from the managed network endpoint. A minimum number of replicas may be specified in the scaling policy, or scale down to zero may be permitted. If so, then as indicated at 1352, the replica may be removed from a host associated with the managed network endpoint, in some embodiments.

As indicated at 1360, an evaluation of performance metrics may be performed as to whether a host should be removed from the managed network endpoint, in some embodiments. For example, an underutilized or unhealthy host may be identified based on number of inference requests performed, resources utilized, or latency of inference requests. If so, then as indicted at 1362, the host may be removed from the managed network endpoint, in some embodiments.

Figure 14:
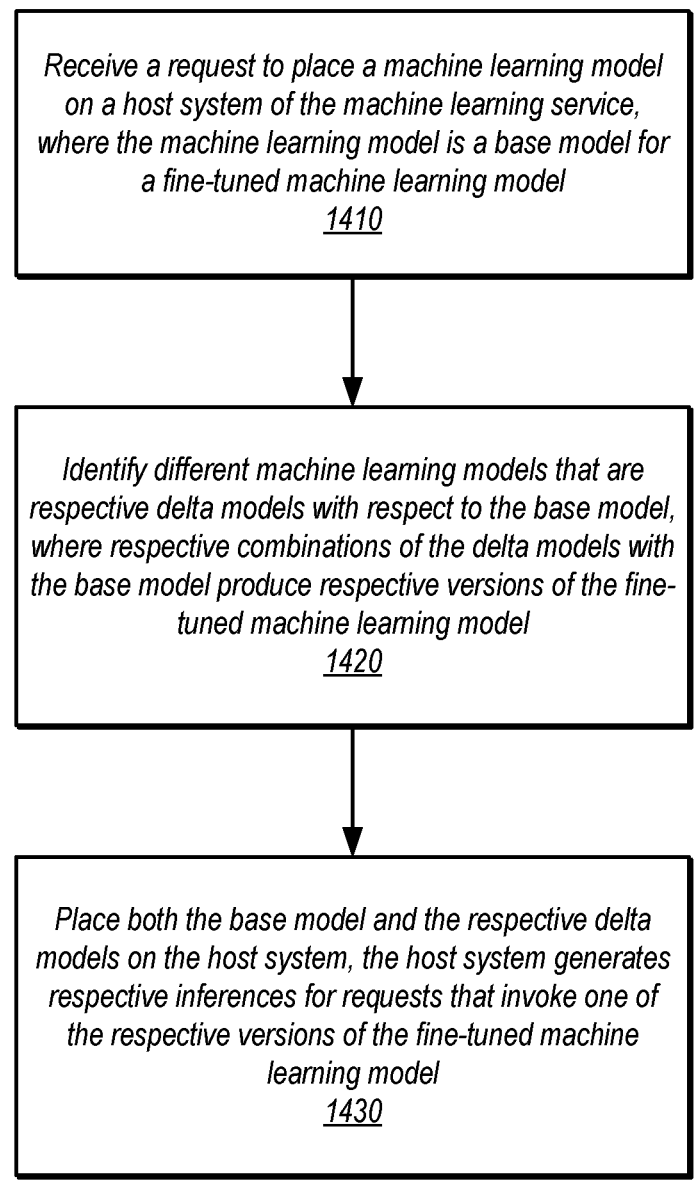
FIG. 14 is a high-level flowchart illustrating various methods and techniques for placing fine-tuned machine learning models, according to some embodiments.

As discussed above with regard to FIG. 9, some fine-tuned machine learning models can achieve further performance improvements through optimal placements. FIG. 14 is a high-level flowchart illustrating various methods and techniques for placing fine-tuned machine learning models, according to some embodiments. As indicated at 1410, a request to place a machine learning model on a host system of the machine learning service may be received. The machine learning model may be a base model for a fine-tuned machine learning model, in some embodiments.

As indicated at 1420, different machine learning models that are respective delta models with respect to the base model may be identified, where respective combinations of the delta models with the base model produce respective versions of the fine-tuned machine learning model, in some embodiments. For example, a registry or other metadata store for machine learning models may indicate available and related machine learning models that share or make use of the base model, acting as delta models to produce fine-tuned inferences. This metadata may explicitly link the delta models, or in some embodiments, a similarity analysis or other type of search may be performed in which potentially relevant delta models may be identified for placement (which can be subsequently removed via requests if a user finds them to be not-relevant).

As indicated at 1430, both the base model and the respective delta models may be placed on the host system, the host system generates respective inferences for requests that invoke one of the respective versions of the fine-tuned machine learning model, in some embodiments. For example, instructions to the host system to obtain both the base model and the identified delta models may be made.

Figure 15:
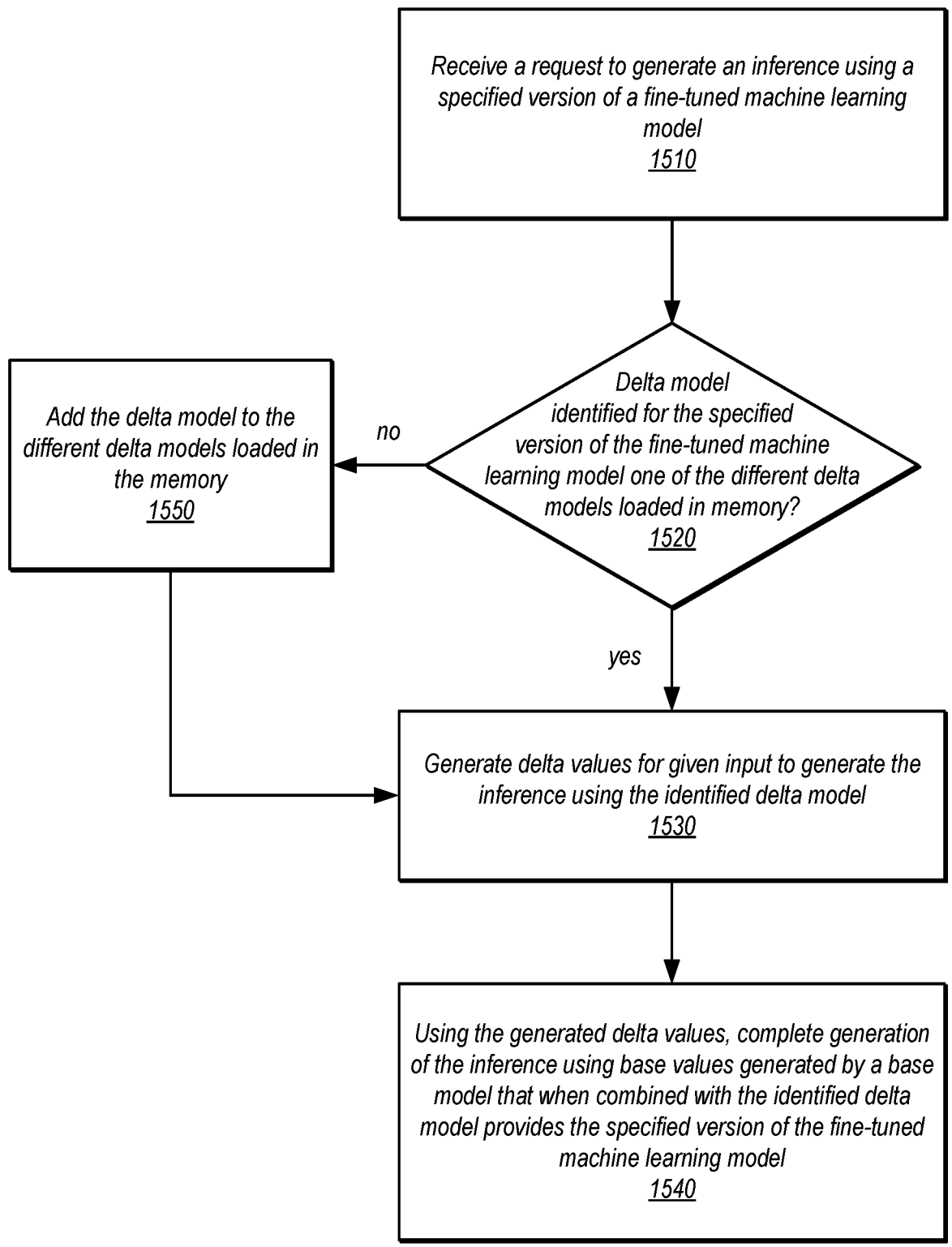
FIG. 15 is a high-level flowchart illustrating various methods and techniques for generating inferences using fine-tuned machine learning models, according to some embodiments.

FIG. 15 is a high-level flowchart illustrating various methods and techniques for generating inferences using fine-tuned machine learning models, according to some embodiments. As indicated at 1510, a request may be received to generate an inference using a specified version of a fine-tuned machine learning model, in some embodiments. For example, the specified version of the fine-tuned model may be an identifier for a delta model, or may be a different identifier that links a particular delta model with a particular base model.

As indicated at 1520, an evaluation may be made with respect to whether a delta model identified for the specified version of the machine learning model is one of the different delta models loaded in memory, in some embodiments. For example, a memory map or other metadata may identify present delta models. If not, then the delta model may be added to the delta models loaded in the memory, as indicated at 1550, in some embodiments. For example, a separate data store (e.g., storage service 230) may be accessed and the delta model obtained).

As indicated at 1530, delta values may be generated for given input to generate the inference using the identified delta model, in some embodiments. For example, if the delta model is a LORA based delta model, matrix multiply operations may be performed using the memory loaded delta model to stream the generated delta values for combination with base values generated using a base model. Other delta value computation techniques may depend on the various delta model types, discussed above with regard to FIG. 9.

As indicated at 1540, the generated delta values may be used to complete generation of the inference using base values generated by a base model that when combined with the identified delta model provides the specified version of the fine-tuned machine learning model, in some embodiments. For example, base model values may be computed according to instructions in a container that is implemented for generating the inference and used to combine or otherwise make use of the generated delta values to complete generation of the inference.

Figure 16:
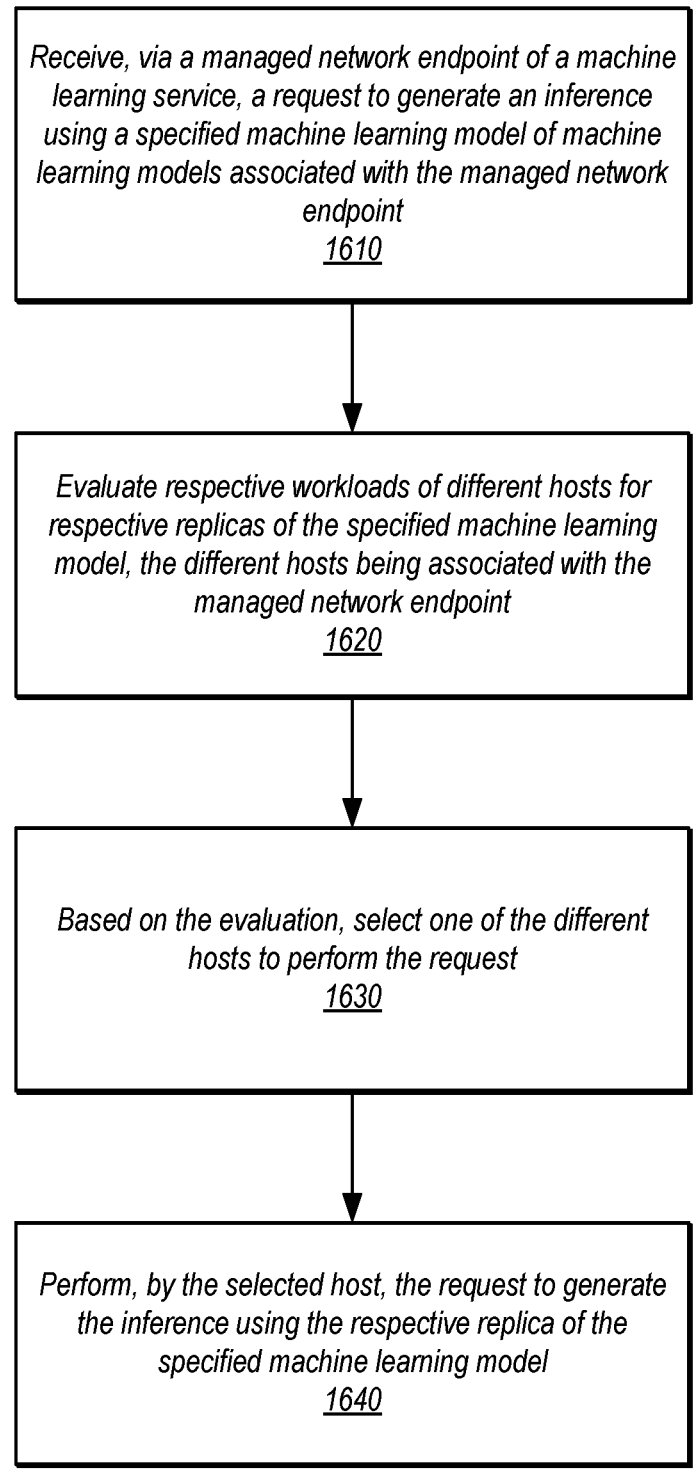
FIG. 16 is a high-level flowchart illustrating various methods and techniques for load aware routing for managed network endpoints, according to some embodiments.

FIG. 16 is a high-level flowchart illustrating various methods and techniques for load aware routing for managed network endpoints, according to some embodiments. As indicated at 1610, a request to generate an inference using a specified machine learning model of machine learning models associated with the managed network endpoint may be received via a managed network endpoint, in some embodiments. For example, the request may include an identifier (e.g., network address) for the managed network endpoint and an identifier for the requested model.

As indicated at 1620, respective workloads of different hosts may be evaluated, in some embodiments, that are associated with the managed network endpoint, in some embodiments. For example, a cache of workload metrics may be accessed (as discussed below) or other real-time workload information may be obtained (e.g., number of inflight inference requests). Because the respective workloads and arrangement of models and hosts in a managed network endpoint may frequently change, new workload information and mapping information may be obtained if, for example, current information is determined to be stale or otherwise erroneous.

As indicated at 1630, based on the evaluation, one of the different hosts may be selected to perform the request, in some embodiments. Different selection strategies may be used, including ones specified in a request that are specific to a managed network endpoint. As discussed in detail below with regard to FIG. 17, one such technique may involve using randomly weighted selection to initialize potential recipients and then picking one of the potential recipients as the selected host.

As indicated at 1640, the selected host may perform the request to generate the inference using the respective replica of the specified machine learning model, in some embodiments. Because the respective workloads and arrangement of models and hosts in a managed network endpoint may frequently change, error handling may be implemented. If a request that is sent to a host fails or returns an error, then a retry mechanism may be implemented. For example, new workload or mapping information may be obtained, and another selection made and attempted.

Figure 17:
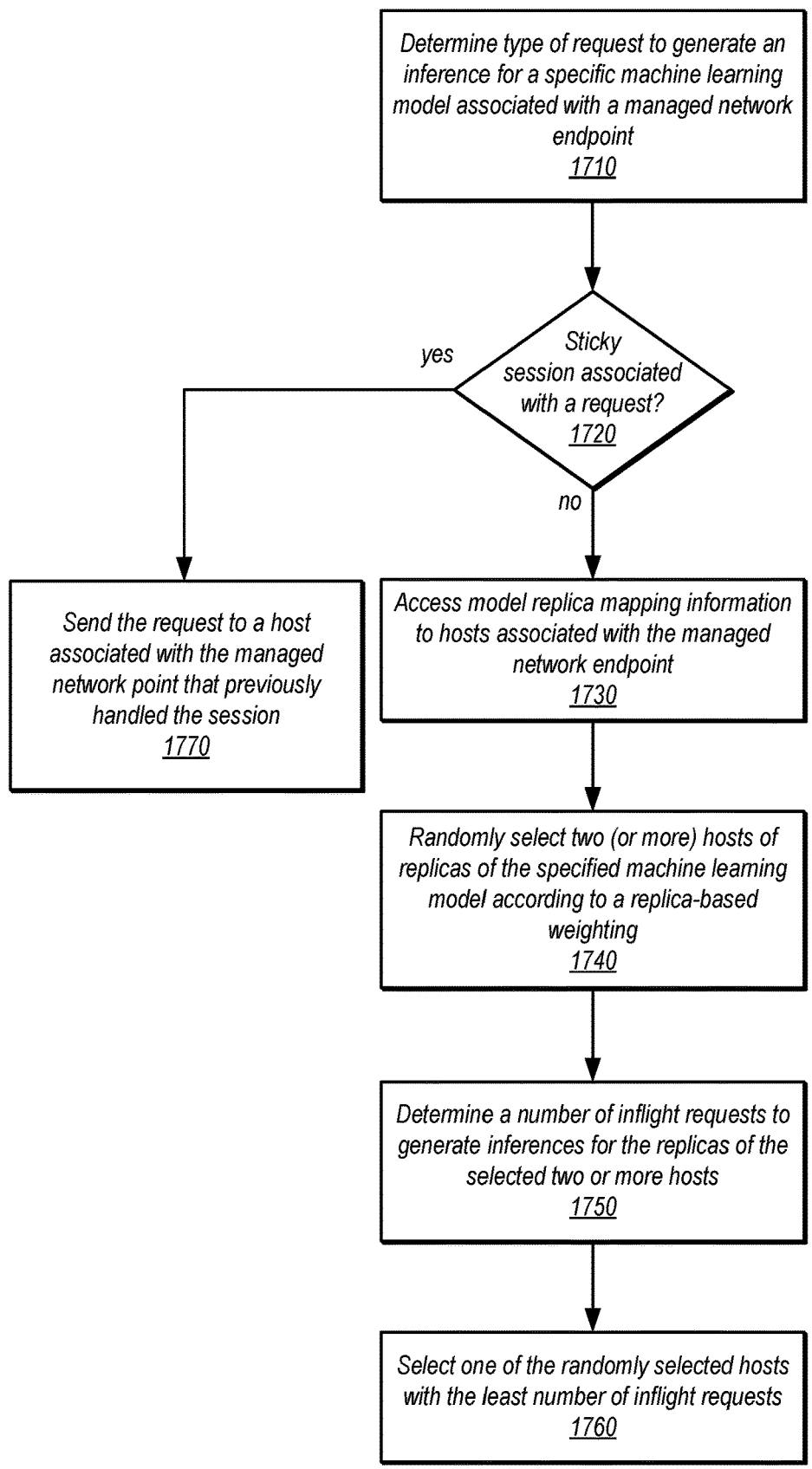
FIG. 17 is a high-level flowchart illustrating various methods and techniques of a selection strategy for load aware routing, according to some embodiments.

FIG. 17 is a high-level flowchart illustrating various methods and techniques of a selection strategy for load aware routing, according to some embodiments. As indicated at 1710, a determination may be made as to the type of request to generate an inference for a specific machine learning model associated with a managed network endpoint, in some embodiments. Some requests may be streaming requests or other types of requests that rely upon multiple interactions in order to perform. Therefore the determined type may be for as sticky session (which may support multiple interactions between a same client and host system).

As indicated at 1720, if the determined type is sticky session associated with a request, then the request may be sent to a host associated with the managed network point that previously handled the session, as indicated at 1770, in some embodiments. For example, an indication may be stored in the cache that indicates which host previously handled the session.

As indicated at 1730, model replica mapping information to hosts associated with the managed network endpoint may be accessed, in some embodiments. For example, this model replica mapping information may be a local cache, as discussed above with regard to FIG. 11. As indicated at 1740, two (or more) hosts of replicas of the specified machine learning model according to a replica-based weighting may be randomly selected, in some embodiments. Random weighting may allow for the scenario that multiple replicas of the same model may be present on the same host, so that randomization is distributed across replicas (e.g., as opposed to being based simply on randomization across hosts).

As indicated at 1750, a number of inflight requests to generate inferences for the replicas of the selected two or more hosts may be determined, in some embodiments. This information may be obtained in real time from hosts (e.g., as part of a heart beat or other status communication sent to a router) or be a previous workload report that is sent from the hosts. As indicated at 1760, one of the randomly selected hosts may be selected with the least number of inflight requests, in some embodiments.

In order to ensure that model transitions do not impact client applications, deployment techniques for transitioning to new models that replace current models may be made to ensure zero downtime for clients. FIG. 18 is a high-level flowchart illustrating various methods and techniques for zero-downtime deployment of new models to a managed network endpoint, according to some embodiments. As indicated at 1810, a request to add a new machine learning model to replace a current machine learning model associated with a managed network endpoint may be received, in some embodiments. The request may be a batch, patch, or group replacement request that covers all replicas of the current model (or just a specific one in other embodiments).

As indicated at 1820, replica(s) of the new model corresponding to replica(s) of the current model may be placed on new or existing host(s) associated with the managed network endpoint, in some embodiments. For example, a model registry may be used to identify the number and location of existing replicas of the current model. Then, placement decisions (e.g., using the techniques discussed above with regard to FIG. 12) may be made for each replica of the new model and instructions to make the placement made.

After placement, inference requests, received at the managed network endpoint, for the current model may be routed to the replica(s) of the new model, as indicated at 1830. As indicated at 1840, the replica(s) of the current model may be removed from the managed network endpoint, in some embodiments. For example, requests to remove the replicas similar to those made for scale down operations may be performed.

The methods described herein may in various embodiments be implemented by any combination of hardware and software. For example, in one embodiment, the methods may be implemented on or across one or more computer systems (e.g., a computer system as in FIG. 19) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 19:
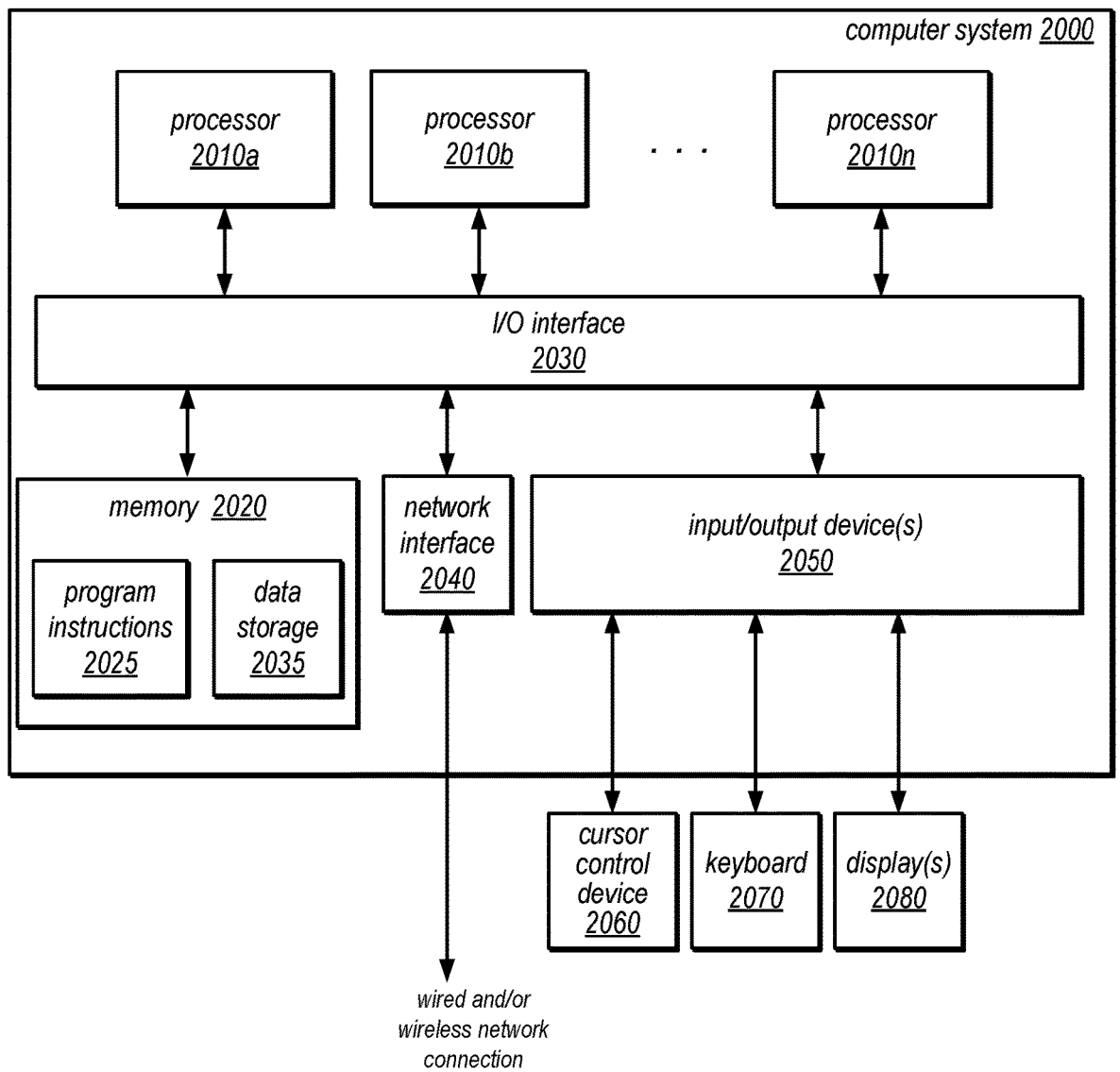
FIG. 19 illustrates an example system to implement the various methods, techniques, and systems described herein, according to some embodiments.

Embodiments of dynamic endpoint management for heterogeneous machine learning models as described herein may be executed on one or more computer systems, which may interact with various other devices. One such computer system is illustrated by FIG. 19. In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above to implement explanation jobs for computer vision tasks, are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 19, memory 2020 may include program instructions 2025, that implement the various methods and techniques as described herein, and data storage 2035, comprising various data accessible by program instructions 2025. In one embodiment, program instructions 2025 may include software elements of embodiments as described herein and as illustrated in the Figures. Data storage 2035 may include data that may be used in embodiments. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

The invention claimed is:

1. A system, comprising:
  a plurality of computing devices, respectively comprising at least one processor and a memory, that implement a machine learning service,
  wherein the machine learning service is configured to:
    host a managed network endpoint, wherein the managed network endpoint provides access to a plurality of different machine learning models hosted at one or more of a plurality of computing resources associated with the managed network endpoint, including the machine learning model, via requests to invoke specified ones of the plurality of different machine learning models received from one or more clients of the machine learning service;
    receive, via the managed network endpoint of the machine learning service, a request to generate an inference using a specified machine learning model of the plurality of different machine learning models associated with the managed network endpoint;
    evaluate, at a router for the managed network endpoint, respective workloads of different hosts for respective replicas of the specified machine learning model, the different hosts being associated with the managed network endpoint;
    based on the evaluation, select, by the router, one of the different hosts to perform the request; and
    forward, by the router, the request to generate the inference using the respective replica of the specified machine learning model to the selected one host.

2. The system of claim 1, wherein to select the one of the different hosts to perform the request, the machine learning service is configured to apply a selection strategy specified via an interface of the machine learning service.

3. The system of claim 1, wherein the respective workloads of different hosts for respective replicas of the specified machine learning model comprises respective numbers of inflight inference requests obtained from the different hosts.

4. The system of claim 1, wherein the managed network endpoint is created in response to one or more requests to create the managed network endpoint and add the plurality of different machine learning models to the managed network endpoint, received via an interface of the machine learning service.

5. A method, comprising:
  receiving, via a managed network endpoint of a machine learning service, a request to generate an inference using a specified machine learning model of a plurality of machine learning models associated with the managed network endpoint;
  evaluating, by the machine learning service, respective workloads of different hosts for respective replicas of the specified machine learning model, the different hosts being associated with the managed network endpoint;
  based on the evaluating, selecting, by the machine learning service, one of the different hosts to perform the request; and
  performing, by the selected one of the different hosts, the request to generate the inference using the respective replica of the specified machine learning model.

6. The method of claim 5, further comprising obtaining, at least part of the respective workloads, from a model registry for the machine learning service to update a model deployment cache for a router of the machine learning service.

7. The method of claim 6, wherein the evaluating the respective model workloads comprises accessing the model deployment cache maintained at the router that includes the respective workloads of the different hosts for the respective replicas of the specified machine learning model.

8. The method of claim 5, wherein the selecting the one of the different hosts to perform the request comprises applying a selection strategy specified via an interface of the machine learning service.

9. The method of claim 5, wherein the selecting the one of the different hosts to perform the request comprises applying a weighted random selection to account for more than one replica of the specified machine learning model being hosted at the different hosts.

10. The method of claim 5, wherein the respective workloads of different hosts for respective replicas of the specified machine learning model comprises respective numbers of inflight inference requests obtained from the different hosts.

11. The method of claim 5, wherein selection of the one host to perform the request is further based on a determination that the request is associated with a sticky session.

12. The method of claim 5, selecting the one host after a prior attempt to send the request to another one of the different hosts failed.

13. The method of claim 5, wherein the managed network endpoint is created in response to one or more requests to create the managed network endpoint and add the plurality of different machine learning models to the managed network endpoint, received via an interface of the machine learning service.

14. One or more non-transitory, computer-readable storage media, storing program instructions that when executed on or across one or more computing devices cause the one or more computing devices to implement a machine learning service that implements:
- receiving, via a managed network endpoint of the machine learning service, a request to generate an inference using a specified machine learning model of a plurality of machine learning models associated with the managed network endpoint;
- evaluating respective workloads of different hosts for respective replicas of the specified machine learning model, the different hosts being associated with the managed network endpoint;
- based on the evaluating, selecting one of the different hosts to perform the request; and
- causing performance of the request to generate the inference using the respective replica of the specified machine learning model.

15. The one or more non-transitory, computer-readable storage media of claim 14, storing further program instructions that when executed on or across the one or more computing devices, cause the one or more computing devices to further implement obtaining, at least part of the respective workloads, from a model registry for the machine learning service to update a model deployment cache for a router of the machine learning service.

16. The one or more non-transitory, computer-readable storage media of claim 14, wherein the selecting the one of the different hosts to perform the request comprises applying a selection strategy specified via an interface of the machine learning service.

17. The one or more non-transitory, computer-readable storage media of claim 14, wherein the selecting the one of the different hosts to perform the request comprises applying a weighted random selection to account for more than one replica of the specified machine learning model being hosted at the different hosts.

18. The one or more non-transitory, computer-readable storage media of claim 14, wherein the respective workloads of different hosts for respective replicas of the specified machine learning model comprises respective numbers of inflight inference requests obtained from the different hosts.

19. The one or more non-transitory, computer-readable storage media of claim 14, wherein selection of the one host to perform the request is further based on a determination that the request is associated with a sticky session.

20. The one or more non-transitory, computer-readable storage media of claim 14, wherein the managed network endpoint is created in response to one or more requests to create the managed network endpoint and add the plurality of different machine learning models to the managed network endpoint, received via an interface of the machine learning service.

* * * * *